United States Patent
Moon et al.

(10) Patent No.: US 10,361,751 B2
(45) Date of Patent: Jul. 23, 2019

(54) MODULATION INDEX SETTING CIRCUITS OF NEAR FIELD COMMUNICATION (NFC) DEVICES, NFC DEVICES, AND METHODS OF OPERATING NFC DEVICES

(71) Applicant: Samsung Electronics Co., Ltd., Suwon-si, Gyeonggi-do (KR)

(72) Inventors: Byeong-Taek Moon, Seoul (KR); Il-Jong Song, Suwon-si (KR); Sung-Hye Choi, Suwon-si (KR); Tae-Ho Park, Gunpo-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/130,049

(22) Filed: Sep. 13, 2018

(65) Prior Publication Data

US 2019/0190567 A1    Jun. 20, 2019

(30) Foreign Application Priority Data

Dec. 14, 2017 (KR) .................. 10-2017-0172418

(51) Int. Cl.
| | |
|---|---|
| *G06K 7/00* | (2006.01) |
| *H04B 5/00* | (2006.01) |
| *H02J 50/12* | (2016.01) |
| *H04B 5/02* | (2006.01) |

(52) U.S. Cl.
CPC ............ *H04B 5/0031* (2013.01); *H02J 50/12* (2016.02); *H04B 5/0037* (2013.01); *H04B 5/0093* (2013.01); *H04B 5/02* (2013.01)

(58) Field of Classification Search
None
See application file for complete search history.

(56) References Cited

U.S. PATENT DOCUMENTS

| | | | |
|---|---|---|---|
| 6,980,084 B1 * | 12/2005 | Yones | ................ G06K 19/0701 340/10.34 |
| 6,995,672 B1 | 2/2006 | Yones | |
| 7,260,371 B1 | 8/2007 | Yones | |

(Continued)

FOREIGN PATENT DOCUMENTS

| | | |
|---|---|---|
| JP | 2006-050406 A | 2/2006 |
| KR | 2009-0006929 U | 7/2009 |

(Continued)

*Primary Examiner* — Tuan A Tran
(74) *Attorney, Agent, or Firm* — Harness, Dickey & Pierce, P.L.C.

(57) ABSTRACT

A modulation index setting circuit of a near field communication (NFC) device, includes a current detector. The current detector generates a reference current based on detecting a transmitter current flowing in a transmitter of the NFC device respectively during a non-modulation interval, and generates a modulation current based on detecting the transmitter current flowing in the transmitter of the NFC device during a modulation interval. The modulation index setting circuit changes the transmitter current based on applying a driving strength control code to the transmitter, receives the reference current and the modulation current, calculates modulation indexes associated with separate, respective code values of the driving strength control code and generates a modulation index table that stores the modulation indexes.

20 Claims, 21 Drawing Sheets

(56) References Cited

U.S. PATENT DOCUMENTS

| | | | |
|---|---|---|---|
| 7,971,794 B2 | 7/2011 | Leutgeb et al. | |
| 8,150,321 B2 * | 4/2012 | Winter | H04B 5/02 |
| | | | 375/140 |
| 8,285,204 B2 * | 10/2012 | Martin | G06K 19/0723 |
| | | | 455/41.1 |
| 8,902,965 B2 * | 12/2014 | Akhavan | H04L 25/03828 |
| | | | 375/238 |
| 8,937,533 B2 | 1/2015 | Takeuchi | |
| 9,106,268 B2 * | 8/2015 | Luong | H04B 5/00 |
| 9,235,735 B2 * | 1/2016 | Peters | G06K 7/0008 |
| 9,306,630 B2 * | 4/2016 | Dhayni | H04B 5/0031 |
| 9,319,984 B2 * | 4/2016 | Noel | H04B 5/02 |
| 9,461,716 B2 | 10/2016 | Cox et al. | |
| 9,553,747 B2 * | 1/2017 | Ramakrishnan | H04L 27/04 |
| 9,646,299 B1 | 5/2017 | Rezayee et al. | |
| 9,654,181 B1 * | 5/2017 | Wobak | H04B 5/0031 |
| 9,948,451 B2 * | 4/2018 | Choke | H04L 7/0037 |
| 10,157,341 B2 * | 12/2018 | Wu | G06K 19/0723 |
| 2008/0237345 A1 | 10/2008 | Moullette et al. | |
| 2009/0289767 A1 * | 11/2009 | Tanaka | G06K 7/0008 |
| | | | 340/10.1 |

FOREIGN PATENT DOCUMENTS

| | | |
|---|---|---|
| KR | 10-1054053 B1 | 8/2011 |
| KR | 10-1209952 B1 | 12/2012 |

* cited by examiner

| DSCD | CURRENT | MI | ZREF |
|---|---|---|---|
| 0XFF | 200mA | - | ZRk |
| 0XFE | 190mA | 2.5% | ZR(k-1) |
| ⋮ | ⋮ | ⋮ | ⋮ |
| 0X03 | 10mA | 90.4% | ZR3 |
| 0X02 | 5mA | 95.2% | ZR2 |
| 0X01 | 2mA | 98.0% | ZR1 |

FIG. 11B

| DSCD | UDS0 | DDS0 | UDS1 | DDS1 |
|---|---|---|---|---|
| 0XFF | 000⋯00 | 000⋯00 | 111⋯11 | 111⋯11 |
| 0XFF | 000⋯01 | 000⋯00 | 111⋯11 | 111⋯10 |
| ⋮ | ⋮ | ⋮ | ⋮ | ⋮ |
| 0X01 | 100⋯00 | 000⋯00 | 111⋯11 | 100⋯00 |

MODULATION INDEX SETTING CIRCUITS OF NEAR FIELD COMMUNICATION (NFC) DEVICES, NFC DEVICES, AND METHODS OF OPERATING NFC DEVICES

CROSS-REFERENCE TO RELATED APPLICATION

This application claims priority under 35 USC § 119 to Korean Patent Application No. 10-2017-0172418, filed on Dec. 14, 2017, in the Korean Intellectual Property Office (KIPO), the contents of which are herein incorporated by reference in their entirety.

BACKGROUND

1. Technical Field

Some example embodiments described herein relate to near field communication (NFC). In particular, some example embodiments relate to modulation index setting circuits of NFC devices, NFC devices, and methods of operating NFC devices.

2. Description of the Related Art

NFC technology is a type of wireless communication technology. Recent developments in NFC technology have resulted in NFC devices being used extensively in mobile devices.

When NFC devices operate in a reader mode, NFC devices communicate with NFC tag by performing modulation to have various modulation indexes.

SUMMARY

According to some example embodiments, a modulation index setting circuit of a near field communication (NFC) device may include a current detector configured to generate a reference current based on detecting a transmitter current flowing in a transmitter of the NFC device during a non-modulation interval, the current detector further configured to generate a modulation current based on detecting the transmitter current flowing in the transmitter of the NFC device during a modulation interval. The modulation index setting circuit may further include a storage device storing a program of instructions, and a processor configured to execute the program of instructions to change the transmitter current based on applying a driving strength control code to the transmitter, receive the reference current and the modulation current, calculate modulation indexes associated with separate, respective code values of the driving strength control code, and generate a modulation index table that stores the modulation indexes.

According to some example embodiments, a near field communication (NFC) device may include a resonance circuit configured to transmit and receive data to and from an external NFC tag through an electromagnetic wave, and an NFC chip configured to transmit output data to the resonance circuit and further configured to receive input data from the resonance circuit. The NFC chip may include a transmitter connected to the resonance circuit through a first transmission terminal and a second transmission terminal, a regulator configured to output a transmission power supply voltage to the transmitter, a modulation index setting circuit configured to calculate modulation indexes associated with separate, respective code values of a driving strength control code based on a reference current and a modulation current, the modulation index setting circuit further configured to generate a modulation index table that stores the modulation indexes, the reference current and the modulation current being generated based on detecting a transmitter current flowing in the transmitter during a non-modulation interval and during a modulation interval, respectively, in response to the driving strength control code, and a processor configured to control the modulation index setting circuit and further configured to control the transmitter to communicate with the NFC tag based on referring to the modulation index table and selecting a first modulation index of the modulation indexes according to a communication protocol between the NFC tag and the NFC device in response to a determination that the NFC tag exists within a communication range of the NFC device.

According to some example embodiments, a method of operating a near field communication (NFC) device, where the NFC device includes a transmitter, a modulation index setting circuit and a processor configured to control the transmitter and the modulation index setting circuit, may include gradually changing a transmitter current that flows in the transmitter based on applying a driving strength control code to the transmitter to generate automatically a modulation index table that stores modulation indexes associated with code values of the driving strength control code based on the transmitter current in response to a determination that an NFC tag does not exist within a communication range of the NFC device. The method may further include controlling the transmitter to communicate with the NFC tag based on referring to the modulation index table and selecting a first modulation index of the modulation indexes according to a communication protocol between the NFC tag and the NFC device in response to a determination that the NFC tag exists within the communication range of the NFC device.

Accordingly, the NFC device may adaptively set a target modulation index by automatically calculating the modulation indexes associated with the code values of the driving strength control code that determines the driving strength of the transmitter, storing the modulation indexes in the modulation index table and applying the driving strength control code according to one of communication protocols when the NFC device communicates with the NFC tag. Therefore, the NFC device may enhance performance.

BRIEF DESCRIPTION OF THE DRAWINGS

Illustrative, non-limiting some example embodiments will be more clearly understood from the following detailed description in conjunction with the accompanying drawings.

FIG. 11A illustrate an example of the modulation index table in the modulation index setting circuit in FIG. 4 and FIG. 11B illustrates driving control signals associated with the driving strength control code.

DETAILED DESCRIPTION OF THE EMBODIMENTS

Figure 1:
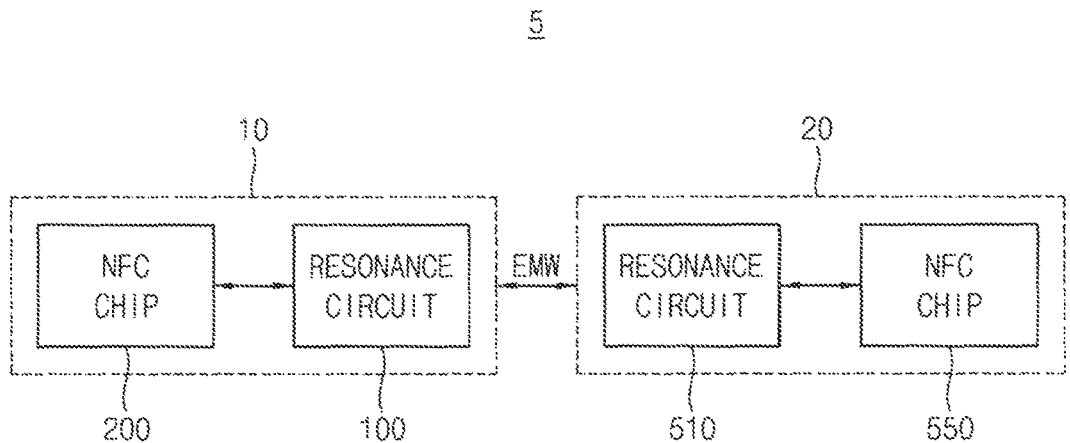
FIG. 1 is a block diagram illustrating a near field communication (NFC) system according to some example embodiments.

Example embodiments of the inventive concepts will be more clearly understood from the following detailed description taken in conjunction with the accompanying drawings, wherein like reference numerals refer to like parts throughout the various figures unless otherwise specified.

FIG. 1 is a block diagram illustrating a near field communication (NFC) system according to some example embodiments.

In an NFC system 5 of FIG. 1, NFC devices 10 and 20 communicate with each other based on an NFC scheme. In a card mode (e.g., in response to the NFC device 10 operating according to a "card mode"), in which the NFC device 10 operates as a card, the NFC device 10 may transceive (transmit and/or receive) data with an NFC device 20 (or NFC reader) based on an electromagnetic wave (EMW) provided from an NFC reader of the NFC device 10. In a reader mode (e.g., in response to the NFC device 10 operating according to a "reader mode"), in which the NFC device 10 operates as a reader, the NFC device 10 may transceive data with the NFC device 20 based on an EMW provided from the NFC device 10.

Referring to FIG. 1, the NFC system 5 includes the NFC devices 10 and 20. The NFC device 20 is referred to interchangeably herein as an "NFC tag." The NFC device 10 may include a resonance circuit 100 and an NFC chip 200. The NFC device 20 may include a resonance circuit 510 and an NFC chip 550. The NFC chip 550 may be referred to interchangeably herein as an "NFC tag chip." The NFC device 20 may be also referred to as an NFC tag. The NFC chip 550 may be also referred to as NFC tag chip.

During reception operation, the resonance circuit 100 receives an input data ("an instance of input data") from the NFC device 20 based on the EMW and the NFC chip 200 receives the input data from the resonance circuit 100. During transmission operation, the NFC chip 200 provides an output message to the resonance circuit 100 and the resonance circuit 100 transmits the output message to the NFC device 20 through the EMW.

In the card mode, the resonance circuit 100 provides ("generates") a signal, where the resonance circuit 100 is induced to provide the signal in response to the EMW received from the NFC device 20, to the NFC chip 200 and the NFC chip 200 performs the signal reception operation by generating the input data by demodulating the signal. In the card mode for a signal transmit operation, the NFC chip 200 provides a modulation signal, which is generated by modulating the output data, to the resonance circuit 100 and the resonance circuit 100 may perform the signal transmission operation by reflecting the EMW received from the NFC device 20 based on the modulation signal.

In the reader mode, the NFC chip 200 may provide a transmission signal as part of a signal transmission operation, which is obtained by synthesizing the modulation signal generated by modulating the output message with a carrier signal, to the resonance circuit 100 and the resonance circuit 100 provides the transmit signal in the form of the EMW to the NFC device 20 to perform the signal transmission operation. In the reader mode, the NFC chip 200 may provide a signal as part of a signal receive operation, which is induced in response to the EMW reflected from the NFC device 20, and the NFC chip 200 generates the input data by demodulating the signal to perform the signal reception operation.

The NFC chip 200 may reduce communication errors during the signal transmission operation by adaptively changing a radio frequency (RF) parameter associated with signal transmission operation during the signal transmission operation in the card mode. In addition, The NFC chip 200 may reduce communication errors during the signal reception operation by adaptively changing a RF parameter associated with the signal reception operation during the signal reception operation in the card mode.

NFC is a contactless short-range wireless communication standard between electronic devices within a short distance of 10 cm with low power consumption by using a frequency of 13.56 MHz. A data transfer rate of an NFC system is 424 Kbps, and an NFC system has excellent security due to high proximity and encryption technology. NFC forgoes a complicated pairing process for recognition of devices but allows devices to recognize one another within 1/10 second or less. In particular, NFC is a smart card type contactless wireless communication technology where radio frequency identification (RFID) technology is utilized. In addition, NFC builds upon RFID technology by allowing two-way communication, as compared to smart cards, which has only one-way communication, and has a relatively large memory storage space and offers more variety of services.

In detail, NFC is a wireless communication method in which data is directly exchanged between terminals, for example, between the NFC device 10 and the NFC device 20, without using a communication network, and is a type of RFID method. A wireless communication method using RFID may be classified according to frequencies used. For example, RFID at 13.56 MHz is mainly used for smart cards, such as transit cards or entrance cards, and RFID at 900 MHz is used mainly for logistics. NFC corresponds to RFID which, like smartcards, uses a frequency of 13.56 MHz. However, unlike smartcards, which allow only one-way communication, NFC allows two-way communication. Accordingly, NFC is different from smart cards, which function merely as a tag that stores particular information and transmits the same to a reader. NFC communication allows a tag function according to necessity but also supports a function of recording information on the tag, and may be used in peer to peer (P2P) data exchange between terminals in which NFC is set.

NFC which is developed based on RFID may be compared with other wireless communication methods, such as Wi-Fi Bluetooth, ZigBee, etc., as shown in FIG. 2A.

Figure 2:
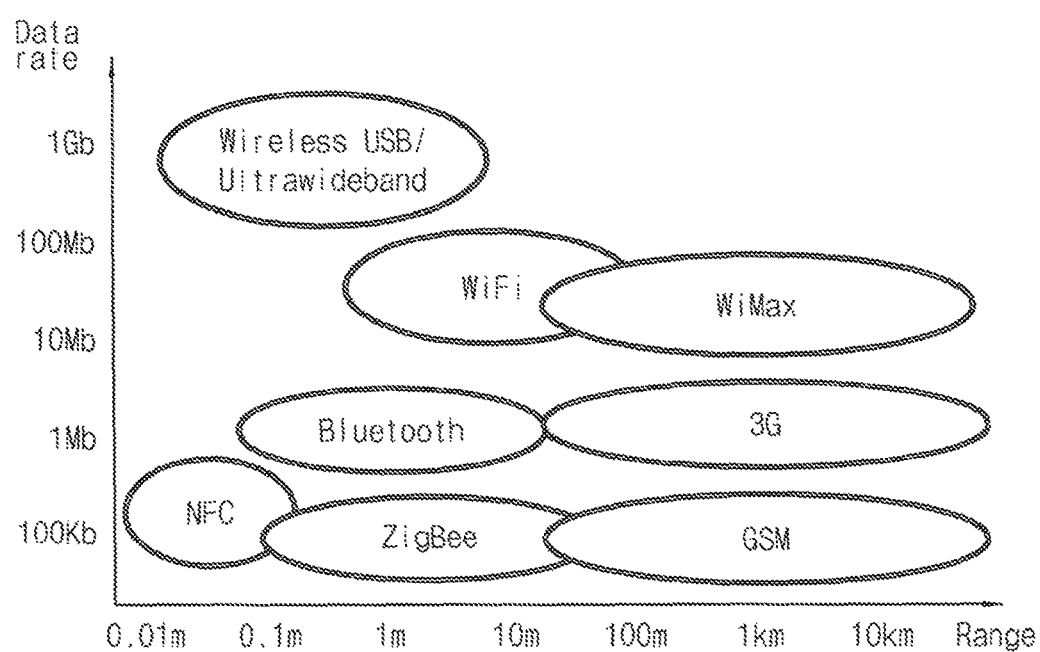
FIG. 2 is a graph comparing data rates and communication ranges of NFC and other wireless communication methods.

FIG. 2 is a graph comparing data rates and communication ranges of NFC and other wireless communication methods.

Referring to FIG. 2, compared to other wireless communication methods, NFC may operate at a distance within about 10 cm. Unlike Bluetooth or Wi-Fi etc., which allow communication in about several to several tens of meters, NFC allows communication only within an extremely short distance (about 10 cm).

In addition, NFC may be compared to other wireless communication methods, such as Bluetooth, ZigBee, etc., as shown in Table 1 below.

TABLE 1

| Technology | Frequency used | security | Standard range | Major service area |
|---|---|---|---|---|
| NFC | 13.56 MHz | Encryption is applied | International Standard | contactless payment, RFID, file transmission |
| Bluetooth | 2.4 GHz | N/A | International Standard | file transmission |
| ZigBee | 2.4 GHz | N/A | International Standard | device control, RFID |
| 900 MHz RFID | 900 MHz | N/A | Korean Standard | RFID |

In other words, compared to other wireless communication methods, NFC operates only within a distance of 10 cm and encryption technology is applied thereto, and thus, a security level of NFC is high. Accordingly, when used in combination with other high-speed wireless communication methods, such as 3G or Wi-Fi, communication between devices via NFC may be performed with a higher efficiency and security. For example, when NFC and Bluetooth technology are combined, NFC may be used in connecting terminals (authorization) and Bluetooth may be used in data transmission between the terminals to thereby enable more efficient communication between the devices.

Figure 3:
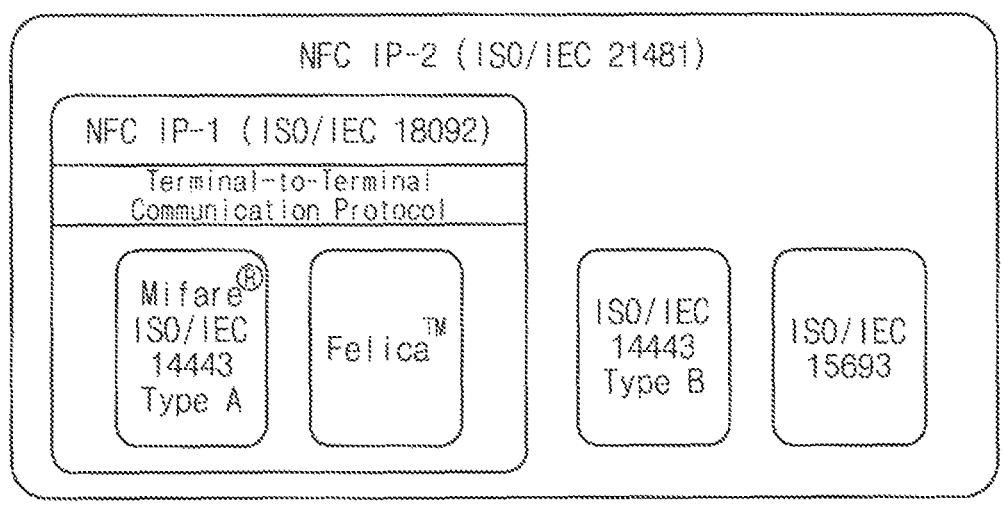
FIG. 3 illustrates standards related to NFC technology.

FIG. 3 illustrates standards related to NFC technology.

Referring to FIG. 3, NFC standard technology follows International Organization for Standardization (ISO) and is also an extension of ISO 14443 Proximity-card Standard, and here, the inclusion relation of NFC IP-1 (NFC Interface Protocol-1)(ISO/IEC 18092) and NFC IP-2 (ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 4:
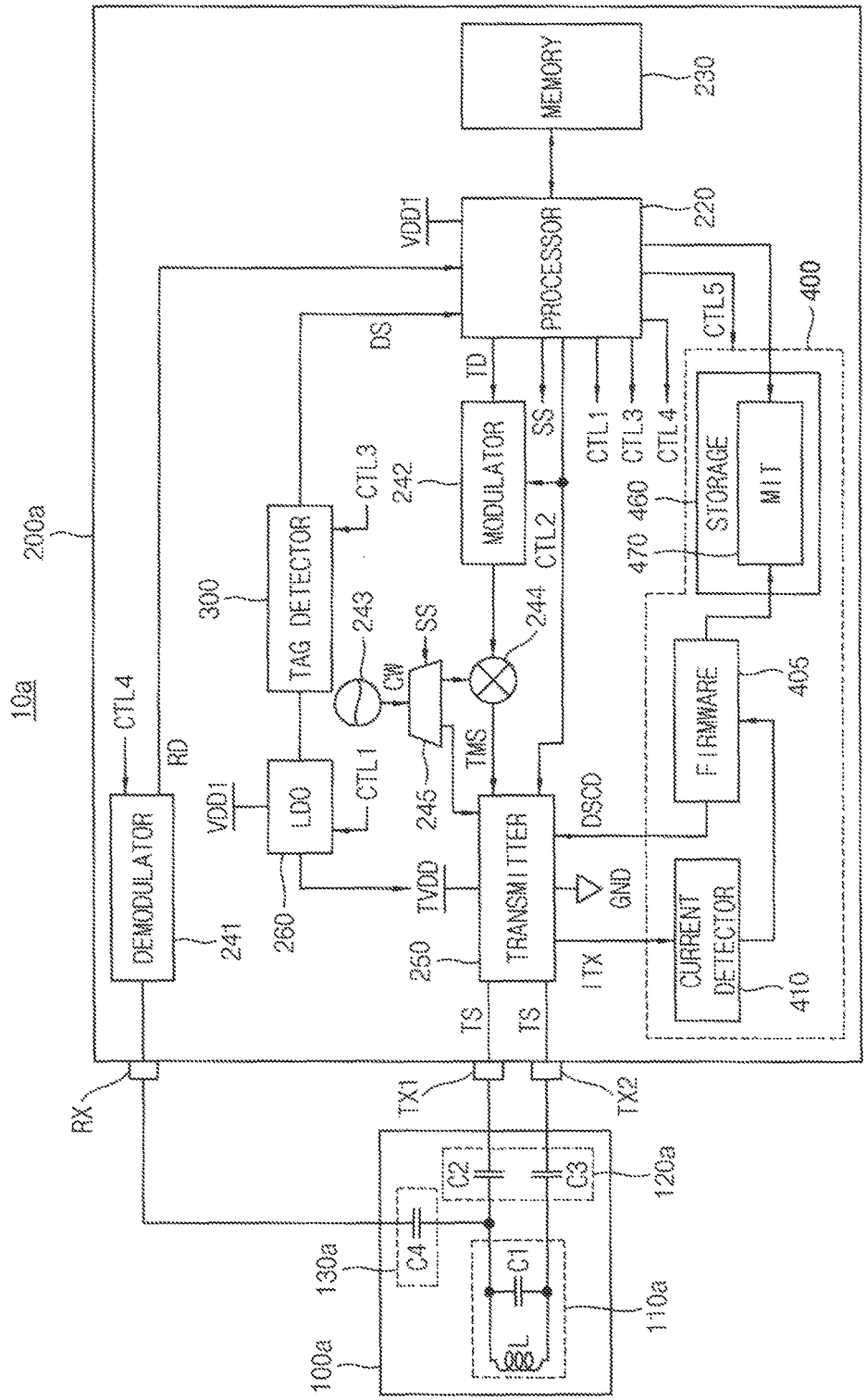
FIG. 4 is a block diagram illustrating an example of the NFC device of FIG. 1 according to some example embodiments.

FIG. 4 is a block diagram illustrating an example of the NFC device of FIG. 1 according to some example embodiments.

Only elements to operate an NFC device 10a in the reader mode are illustrated in FIG. 4 and elements to operate the NFC device 10a in the card mode are omitted in FIG. 4.

Referring to FIG. 4, the NFC device 10a may include a resonance circuit 100a and an NFC chip 200a. The NFC chip 200a may be connected to the resonance circuit 100 through a first transmission terminal TX1, a second transmission terminal TX2 and a reception terminal RX. The resonance circuit 100a may transmit and receive data to and from (e.g., may transceive data with) NFC tag 20 through an electromagnetic wave EMW, and the NFC chip 200a may transmit output data to the resonance circuit 100a and may receive input data from the resonance circuit 100a.

The resonance circuit 100a may include a resonance circuit 110a having an antenna L and a first capacitor C1 and a matching circuit 120a, connected to the resonance circuit 110a, the first transmission terminal TX1 and the second transmission terminal TX2, and having a second capacitor C2 and a third capacitor C3 to performing an impedance matching and a first filter 130a, connected to the resonance circuit 110a and the reception terminal RX and having a fourth capacitor C4.

The configuration of the resonance circuit 100a illustrated in FIG. 4 is an example only and the configuration of the resonance circuit 100a according to some example embodiments may not be limited to the above, but may be variously modified.

The NFC chip 200a may perform transmission operation through the first and second transmission terminals TX1 and TX1 in an active mode and may perform reception operation through the reception terminal RX in the active mode. The NFC chip 200a may set a modulation index automatically and may perform detection operation in a stand-by mode.

The NFC chip 200a may include a processor 220, a memory 230, a demodulator 241, a modulator 242, an oscillator 243, a mixer 244, a demultiplexer 245, a transmitter 250, a regulator 260, a tag detector 300 and a modulation index setting circuit 400.

The processor 220 may control the overall operation of the NFC chip 200a. The processor 220 may operate by receiving a first supply voltage VDD1 from a power source, such as a battery.

When the signal reception operation is performed in the active mode ("in response to the signal reception operation being performed in the active mode"), the demodulator 241 generates reception date RD by demodulating the signal supplied from the resonance circuit 100a through the reception terminal RX to provide the reception data RD to the processor 220. The processor 220 may store the reception data RD in the memory 230.

When the signal transmission operation is performed in the active mode ("in response to the signal transmission operation being performed in the active mode"), the processor 220 reads out transmission data TD from the memory 230 to provide the transmission data TD to the modulator 242, and the modulator 242 may modulate the transmission data TD to provide a modulation signal. In addition, the oscillator 243 may generate a carrier signal CW having a frequency corresponding to a carrier frequency (for example, 13.56 MHz), the demultiplexer 245 may provide the carrier signal CW to the mixer 244 in response to a selection signal SS, and the mixer 244 may combine the carrier signal CW with the modulated signal to generate a transmission modulation signal TMS.

In each of a preset phase and a detection phase of a stand-by mode, the demultiplexer 245 may provide the carrier signal CW to the transmitter 250 in response to the selection signal SS from the processor 220 and the transmitter 250 may generate a transmission signal TS based on the carrier signal CW to perform a detection operation for detecting the NFC tag 20.

The transmitter 250 may be connected to the resonance circuit 100a through the first and second transmission terminals TX1 and TX2. The transmitter 250 may be connected between a transmission power supply voltage TVDD and a ground voltage GND. The transmitter 250 may receive the carrier signal CW from the demultiplexer 245 in the stand-by mode and generate the transmission signal TS corresponding to the carrier signal CW. In addition, the transmitter 250 may receive the transmission modulation signal TMS from the mixer 244 in the active mode and the resonance circuit 100a may generate the electromagnetic wave EMW corresponding to the transmission signal TS provided from the transmitter 250 through the first and second transmission terminals TX1 and TX2. For example, the transmitter 250 may allow the first and second transmit terminals TX1 and TX2 to be connected to either the transmission power supply voltage TVDD through a pull-up load or the ground voltage GND through pull-down load based on the transmission modulation signal TMS in the active mode, so that the transmission signal TS may be provided to the resonance circuit 100a through the first and second transmit terminals TX1 and TX2.

The processor 220 may provide the transmitter 250 with a control signal CTL2 having a plurality of bits indicating a mode and operation of the NFC device 10a based on the mode and the operation of the NFC device 10a. In addition, the processor 220 may control operation of the modulation index setting circuit 400 by providing a control signal CTL4 to the modulation index setting circuit 400.

The regulator 260 is connected to the first power supply voltage VDD1 and may provide ("output") the transmission power supply voltage TVDD to the transmitter 250. The regulator 260 may be implemented with a low drop-out (LDO) regulator and may adjust a level of the transmission power supply voltage TVDD in response to a control signal CTL1 from the processor 220.

The tag detector 300 is connected to the regulator 260, may monitor a current (regulator current) flowing in the regulator 260 when the electromagnetic wave EMW is radiated through the resonance circuit 100a respectively in a preset phase and a detection phase, and may determine whether an NFC tag (i.e., the NFC device 20) is within a communication range of the NFC device 10a based on a comparison of a first sensing current in the preset phase and a second sensing current in the detection phase.

The tag detector 300 may determine whether the NFC tag 20 is within a communication range of the NFC device 10a and may output a detection signal DS to the processor 220, which indicates whether the NFC tag 20 is within a communication range of the NFC device 10a. The processor 220 may receive the detection signal DS and may determine an operation mode of the NFC device 10a based on a logic level of the detection signal DS.

When the NFC tag 20 is out of the communication range of the NFC device 10a ("in response to a determination that the NFC tag 20 is out of the communication range of the NFC device 10a") and the detection signal DS has a first logic level (logic low level), the processor 220 may maintain the operation mode of the NFC device 10a as the stand-by mode. When the NFC tag 20 is within the communication range of the NFC device 10a ("in response to a determination that the NFC tag 20 within the communication range of the NFC device 10a") and the detection signal DS has a second logic level (logic high level), the processor 220 may change the operation mode of the NFC device 10a from the stand-by mode to the active mode. Restated, the processor 220 may change an operation mode of the NFC device 10a from a stand-by mode to an active mode based on the detection signal DS.

The modulation index setting circuit 400 may be configured to calculate modulation indexes associated with separate, respective code values of a driving strength control code DSCD based on a reference current and a modulation current and may be further configured to generate a modulation index table that stores the modulation indexes, where the reference current and the modulation current are generated based on detecting a transmitter current flowing in the transmitter 250 during a non-modulation interval and during a modulation interval, respectively, in response to the driving strength control code DSCD.

The modulation index setting circuit 400 may set modulation indexes automatically in response to the control signal CTL5 in the transmission operation in the stand-by mode. For example, where a processor implements the modulation index management firmware 405 (as described further below), the processor (e.g., processor 220 and/or modulation index setting circuit processor as described herein) may automatically calculate the modulation indexes to generate the modulation index table in response to a determination that an NFC tag 20 is not within a communication range of the NFC device 10a (e.g., the NFC device 10a is in a "stand-by mode"). The processor may control the transmitter 250 to select a first modulation index of the modulation indexes according to a communication protocol between the NFC tag 20 and the NFC device 10a and to have driving strength associated with the selected modulation index. The processor may cause the transmitter 250 to communicate with the NFC tag 20 based on referring to the modulation index table and selecting a first modulation index of the modulation indexes according to a communication protocol between the NFC tag 20 and the NFC device 10a in response to a determination that the NFC tag 20 is within the communication range of the NFC device 10a (e.g., the NFC device 10a is in an "active mode"). The modulation index setting circuit 400 may apply a driving strength control code DSCD to the transmitter 250 may sequentially change a transmitter current that flows in the transmitter 250, generate a reference current and a modulation current by detecting the transmitter current that flows in the transmitter 250 respectively in a non-modulation interval and in a modulation interval, may calculate the modulation indexes based on the reference current and the modulation current and may generate a modulation index table 470 that stores the modulation index.

It will be understood that, as used herein, performing an operation "automatically" refers to performing the operation without manual intervention, for example manual intervention to initiate, control, and/or end the operation. For example, as described above, where a processor automatically calculates modulation indexes, the processor will be understood to calculate the modulation indexes without manual (e.g., human) intervention.

The modulation index setting circuit 400 may include modulation index management firmware 405, a current detector 410 and a storage device 460.

The current detector 410 may generate the reference current and the modulation current by detecting a transmitter current ITX that flows in the transmitter 250 respectively in the non-modulation interval and in the modulation interval. The modulation index management firmware 405 may change the transmitter current ITX that flows in the transmitter 250 by applying the driving strength control code DSCD, may receive the reference current and the modulation current, may calculate the modulation indexes associated code values of the driving strength control code DSCD and may generate a modulation index table 470 that stores the modulation indexes MI. The storage device 460 may store the modulation index management firmware 405 and the modulation index table 470. The storage device 460 may be a flash memory.

In some example embodiments, the modulation index management firmware 405 may be implemented by a processor executing a program of instructions stored on a memory. For example, the modulation index management firmware 405 illustrated in at least FIG. 4 may be a processor, also referred to as an instance of processing circuitry (e.g., a central processing unit, an application-specific integrated circuit, or the like), that is configured to execute a program of instructions stored on storage device 460 (also referred to herein as a memory) to implement the functionality associated with the modulation index management firmware 405 as described herein. In some example embodiments, processor 220 may execute a program of instruction stored on storage device 460 to implement the functionality associated with the modulation index management firmware 405.

In some example embodiments, the modulation index management firmware 405 comprises a non-transitory computer readable storage medium storing a computer-executable program of instructions that, when executed by a computing system (e.g., a processor), cause the computing system to implement the aforementioned functionality associated with the modulation index management firmware as described herein.

Therefore, in some example embodiments, the modulation index setting circuit 400 may include a current detector 410 configured to generate a reference current based on detecting a transmitter current flowing in a transmitter of the NFC device during a non-modulation interval, the current detector further configured to generate a modulation current based on detecting the transmitter current flowing in the transmitter of the NFC device during a modulation interval. The modulation index setting circuit 400 may further include a storage device 460 storing a program of instructions and a processor (e.g., represented by "firmware 405" in FIG. 4), also referred to herein as a modulation index setting circuit processor, that is configured to execute the program of instructions to change the transmitter current based on applying a driving strength control code to the transmitter, receive the reference current and the modulation current, calculate modulation indexes associated with separate, respective code values of the driving strength control code, and generate a modulation index table that stores the modulation indexes.

As described herein, the processor 220 may control the modulation index setting circuit 400 and may control the transmitter 250 to communicate with the NFC tag 20 based on referring to the modulation index table and selecting a first modulation index of the modulation indexes according to a communication protocol between the NFC tag 20 and the NFC device 10a, in response to a determination that the NFC tag 20 exists within a communication range of the NFC device 10a.

Figure 5:
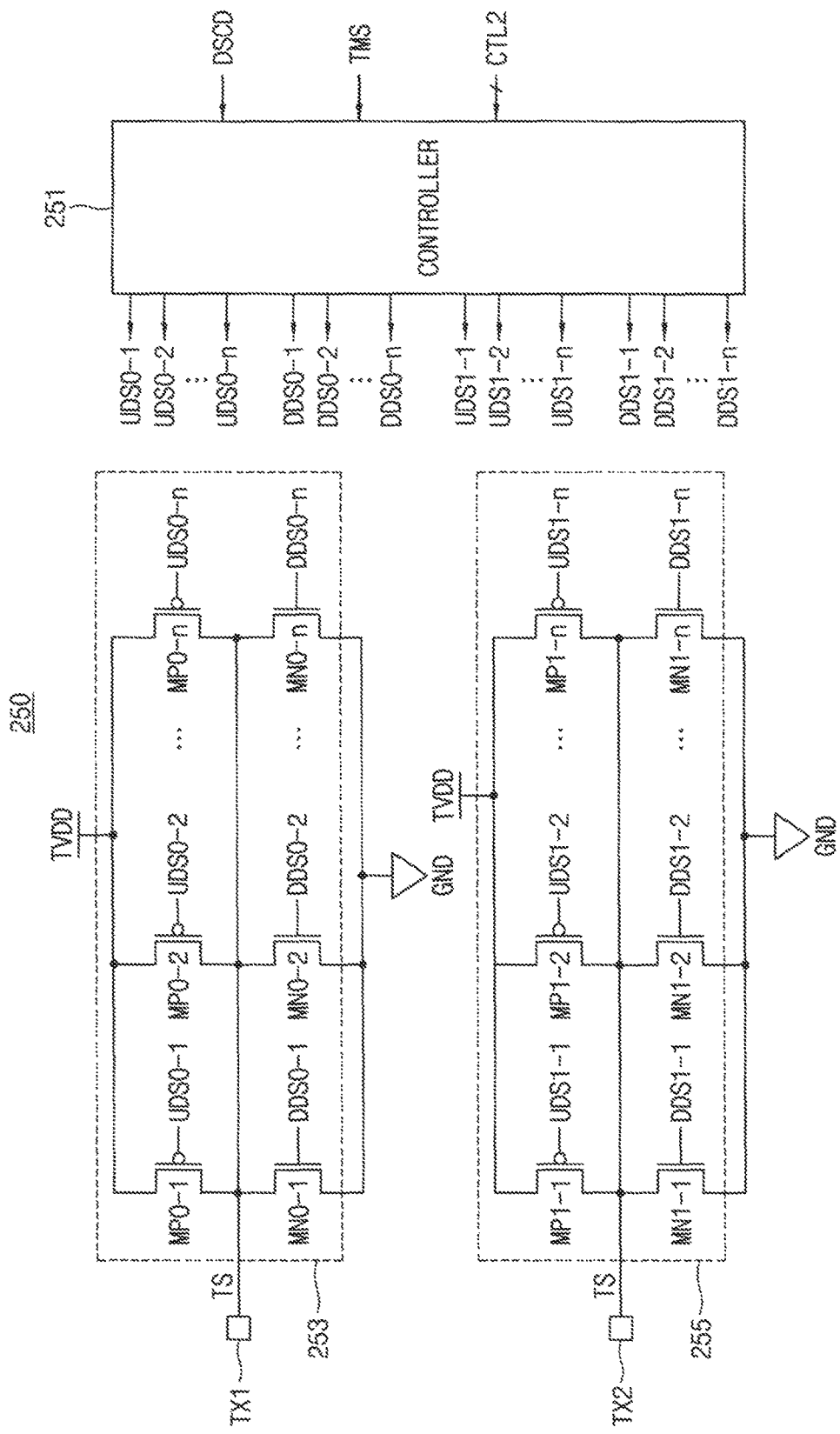
FIG. 5 is a block diagram illustrating an example of the transmitter in the NFC device of FIG. 4.

FIG. 5 is a block diagram illustrating an example of the transmitter 250 in the NFC device of FIG. 4.

Referring to FIG. 5, the transmitter 250 may include a first driver 253, a second driver 255 and a controller 251. The first driver 253 may include a plurality of first pull-up transistors MP0-1, MP0-2, . . . , and MP0-$n$ and a plurality of first pull-down transistors MN0-1, MN0-2, . . . , and MN0-$n$. The second driver 255 may include a plurality of second pull-up transistors MP1-1, MP1-2, . . . , and MP1-$n$ and a plurality of second pull-down transistors MN1-1, MN1-2, . . . , and MN1-$n$.

The first pull-up transistors MP0-1, MP0-2, . . . , and MP0-$n$ and the second pull-up transistors MP1-1, MP1-2, . . . , and MP1-$n$ may be PMOS transistors, and the first pull-down transistors MN0-1, MN0-2, . . . , and MN0-$n$ and the second pull-down transistors MN1-1, MN1-2, . . . , and MN1-$n$ may be the NMOS transistors.

The first pull-up transistors MP0-1, MP0-2, . . . , and MP0-$n$ may be connected in parallel between the transmission supply voltage TVDD and the first transmission terminal TX1, and the first pull-down transistors MN0-1, MN0-2, . . . , and MN0-$n$ may be connected in parallel between the first transmission terminal TX1 and the ground voltage GND. The second pull-up transistors MP1-1, MP1-2, . . . , and MP1-$n$ may be connected in parallel between the transmission supply voltage TVDD and the second transmission terminal TX2 and the second pull-down transistors MN1-1, MN1-2, . . . , and MN1-$n$ may be connected in parallel between the second transmission terminal TX2 and the ground voltage GND.

The controller 251 may drive the first pull-up transistors MP0-1, MP0-2, . . . , and MP0-$n$ through a plurality of first pull-up driving signals UDS0-1, UDS0-2, . . . , and UDS0-$n$, respectively, drive the first pull-down transistors MN0-1, MN0-2, . . . , and MN0-$n$ through a plurality of first pull-down driving signals DDS0-1, DDS0-2, . . . , and DDS0-$n$, respectively, drive the second pull-up transistors MP1-1, MP1-2, . . . , and MP1-$n$ through a plurality of second pull-up driving signals UDS1-1, UDS1-2, . . . , and UDS1-$n$, respectively, and drive the second pull-down transistors MN1-1, MN1-2, . . . , and MN1-$n$ through a plurality of second pull-down driving signals DDS1-1, DDS1-2, . . . , and DDS1-$n$, respectively.

The controller 251 may determine whether the NFC chip 200a is in the stand-by mode or the active mode based on the control signal CTL2 supplied from the processor 220.

In the stand-by mode, the controller 251 may sequentially turn off the first pull-up transistors MP0-1, MP0-2, . . . , and MP0-$n$, turn-off the first pull-down transistors MN0-1, MN0-2, . . . , and MN0-$n$ respectively, turn-off the second pull-up transistors MP1-1, MP1-2, . . . , and MP1-$n$ respectively and sequentially turn-off the second pull-down transistors MN1-1, MN1-2, . . . , and MN1-$n$ in response to the driving strength control code DSCD such that current from the transmission power supply voltage TVDD flows to the ground voltage GND through some of the first pull-up transistors MP0-1, MP0-2, . . . , and MP0-$n$, the first transmission terminal TX1, the resonance circuit 100a, the second transmission terminal TX2 and some of the second pull-down transistors MN1-1, MN1-2, ..., and MN1-$n$ and a magnitude of the transmitter current ITX may sequentially decrease.

In some example embodiments, a processor (e.g., processor 220 and/or modulation index setting circuit processor as described herein) may sequentially turn-off the first pull-up transistors MP0-1, MP0-2, ..., and MP0-$n$ simultaneously with sequentially turning-off the second pull-down transistors MN1-1, MN1-2, ..., and MN1-$n$ based on sequentially decreasing the code values of the driving strength control code DSCD.

In the stand-by mode, the controller 251 may sequentially turn on the first pull-up transistors MP0-1, MP0-2, ..., and MP0-$n$, turn-off the first pull-down transistors MN0-1, MN0-2, ..., and MN0-$n$ respectively, turn-off the second pull-up transistors MP1-1, MP1-2, ..., and MP1-$n$ respectively and sequentially turn-on the second pull-down transistors MN1-1, MN1-2, ..., and MN1-$n$ in response to the driving strength control code DSCD such that current from the transmission power supply voltage TVDD flows to the ground voltage GND through some of the first pull-up transistors MP0-1, MP0-2, ..., and MP0-$n$, the first transmission terminal TX1, the resonance circuit 100$a$, the second transmission terminal TX2 and some of the second pull-down transistors MN1-1, MN1-2, ..., and MN1-$n$ and a magnitude of the transmitter current ITX may sequentially decrease.

In some example embodiments, a processor (e.g., processor 220 and/or modulation index setting circuit processor as described herein) may sequentially turn-on the first pull-up transistors MP0-1, MP0-2, ..., and MP0-$n$ simultaneously with sequentially turning-on the second pull-down transistors MN1-1, MN1-2, ..., and MN1-$n$ based on sequentially increasing the code values of the driving strength control code DSCD.

In the active mode, the controller 251 turn-on the first pull-up transistors MP0-1, MP0-2, ..., and MP0-$n$, the first pull-down transistors MN0-1, MN0-2, ..., and MN0-$n$, the second pull-up transistors MP1-1, MP1-2, ..., and MP1-$n$ or the second pull-down transistors MN1-1, MN1-2, ..., and MN1-$n$ based on the transmission modulation signal TMS and the driving strength control code DSCD.

Restated, the controller 251 may output driving signals to the first driver 253 and the second driver 255 in response to the driving strength control code DSCD or a control signal from the processor 220.

In addition, the transmitter 250 may drive the first pull-up transistors MP0-1, MP0-2, ..., and MP0-$n$, the second pull-up transistors MP1-1, MP1-2, ..., and MP1-$n$, the first pull-down transistors MN0-1, MN0-2, ..., and MN0-$n$ and the second pull-down transistors MN1-1, MN1-2, ..., and MN1-$n$ based on the transmission modulation signal TMS and the driving strength control code DSCD in the active mode to perform the transmission operation to provide the transmission signal TS to the resonance circuit 100$a$.

Figure 6:
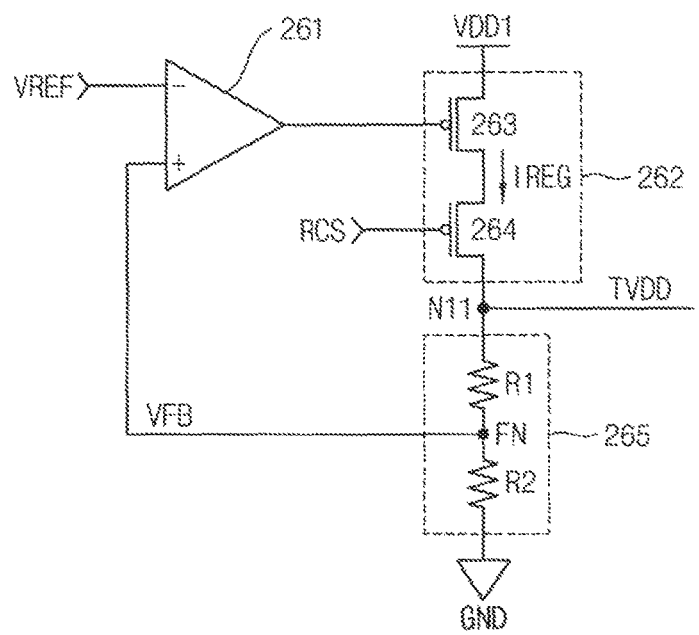
FIG. 6 is a circuit diagram illustrating the regulator in the NFC device of FIG. 4 according to some example embodiments.

FIG. 6 is a circuit diagram illustrating the regulator in the NFC device of FIG. 4 according to some example embodiments.

Referring to FIG. 6, the regulator 260 includes an operational amplifier 261, a current generator 262 and a feedback unit 265.

The operational amplifier 261 has a first (negative) input terminal receiving a reference voltage VREF, a second (positive) input terminal receiving a feedback voltage VFB and an output terminal. The operational amplifier 261 compares the reference voltage VREF and the feedback voltage VFB to provide the current generator 262 with an output indicating a result of comparison of the reference voltage VREF and the feedback voltage VFB through the output terminal.

The current generator 262 include a first PMOS transistor 263 and a second PMOS transistor 264 which are connected in series between the first power supply voltage VDD1 and an output node N11. The first PMOS transistor 263 has a source connected to the first power supply voltage VDD1 and a gate connected to the output terminal of the operational amplifier 261. The second PMOS transistor 264 has a source connected to a drain of the first PMOS transistor 263, a gate receiving a regulator control signal RCS and a drain connected to the output node N11. The transmission power supply voltage TVDD which is applied to the transmitter 250 is output at the output node N11.

A regulator current IREG flows from the first power supply voltage VDD1 to the output node N11 through the first and second PMOS transistors 263 and 264, and a magnitude of the regulator current IREG may be adjusted according to the regulator control signal RCS that may be included in the control signal CTL1. The feedback unit 265 includes a first resistor R1 and a second resistor R2 connected in series between the output node N11 and the ground voltage GND. The first and second resistors R1 and R2 are connected to each other at a feedback node FN, and the feedback voltage VFB is provided to the second input terminal of the operational amplifier 261. The transmission power supply voltage TVDD is voltage-divided to the feedback voltage VFB by the first and second resistors R1 and R2.

Figure 7:
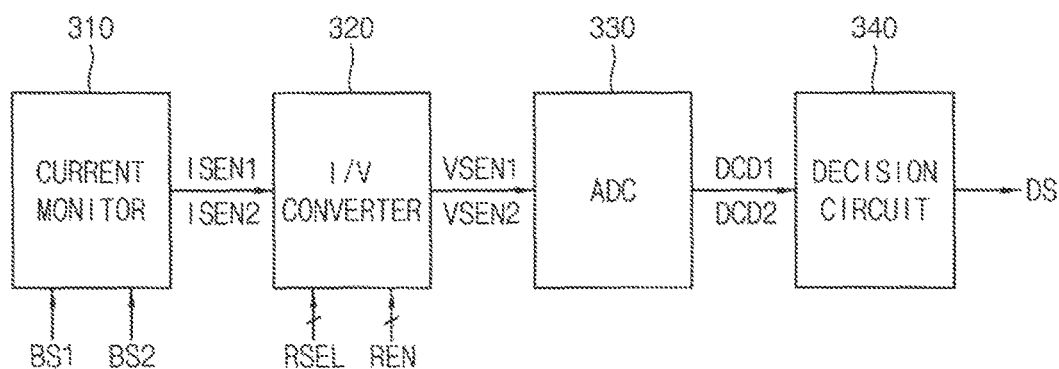
FIG. 7 is a block diagram illustrating the tag detector in the NFC device of FIG. 4 according to some example embodiments.

FIG. 7 is a block diagram illustrating the tag detector in the NFC device of FIG. 4 according to some example embodiments.

Referring to FIG. 7, the tag detector 300 may include a current monitor 310, a current to voltage converter 320, an analog to digital converter (ADC) 330 and a decision circuit 340.

The current monitor 310 is connected to the output terminal of the operational amplifier 261 and generates a first sensing current ISEN1 and a second sensing current ISEN2 by monitoring the regulator current IREG flowing in the regulator 260 respectively in the preset phase and in the detection phase. The current monitor 310 may generate the first sensing current ISEN1 and the second sensing current ISEN2 respectively in the preset phase and in the detection phase by receiving a first bias signal BS1 and a second bias signal BS2.

The current to voltage converter 320 may convert the first sensing current ISEN1 and the second sensing current ISEN2 to a first sensing voltage VSEN1 and a second sensing voltage VSEN2, respectively in the preset phase and in the detection phase.

The ADC 330 may convert the first sensing voltage VSEN1 and the second sensing voltage to a first digital code DCD1 and a second digital code DCD2, respectively in the preset phase and in the detection phase.

The decision circuit 340 may output the detection signal DS to the processor 220, which indicates that the NFC tag 20 is within a communication range of the NFC device 10$a$ based on a comparison of the first digital code DCD1 and the second digital code DCD2.

Restated, the tag detector 300 may generate a first sensing current ISEN1 and a second sensing current ISEN2 flowing in the regulator 260 in a preset phase and a detection phase, respectively, in response to the electromagnetic wave EMW being radiated, compare the first sensing current ISEN1 and the second sensing current ISEN2, and output a detection signal DS indicating that the NFC tag 20 is within a communication range of the NFC device 10a based on the comparison.

Figure 8:
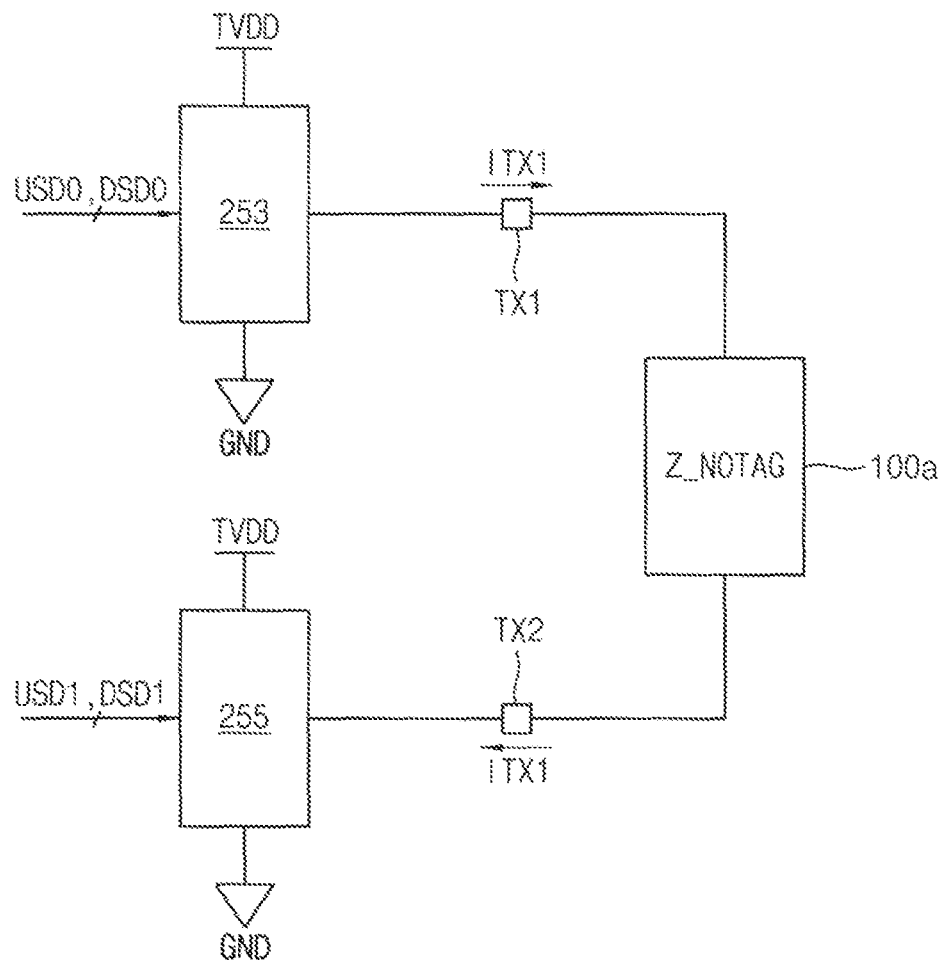
FIG. 8 illustrates operation of a portion of the NFC device of FIG. 4 in the stand-by mode.

FIG. 8 illustrates operation of a portion of the NFC device of FIG. 4 in the stand-by mode.

FIG. 8 illustrates an example that the NFC tag 20 is out of the communication range of the NFC device 10a.

Referring to FIGS. 4, 5 and 8, when the NFC tag 20 is out of the communication range of the NFC device 10a, a first transmitter current ITX1 flows from the first driver 253 of the transmitter 250, through the first transmission terminal TX1, the resonance circuit 100a and the second transmission terminal TX2, to the second driver 255 of the transmitter 250. In this case, an impedance of the resonance circuit 100a corresponds to Z_NOTAG. The modulation index setting circuit 400 may sequentially change (increase or decrease) the code values of the driving strength control code DSCD to sequentially change a first transmitter current ITX1 through driving control signals and may calculate the modulation index associated with each of the code values of the driving strength control code DSCD.

Figure 9:
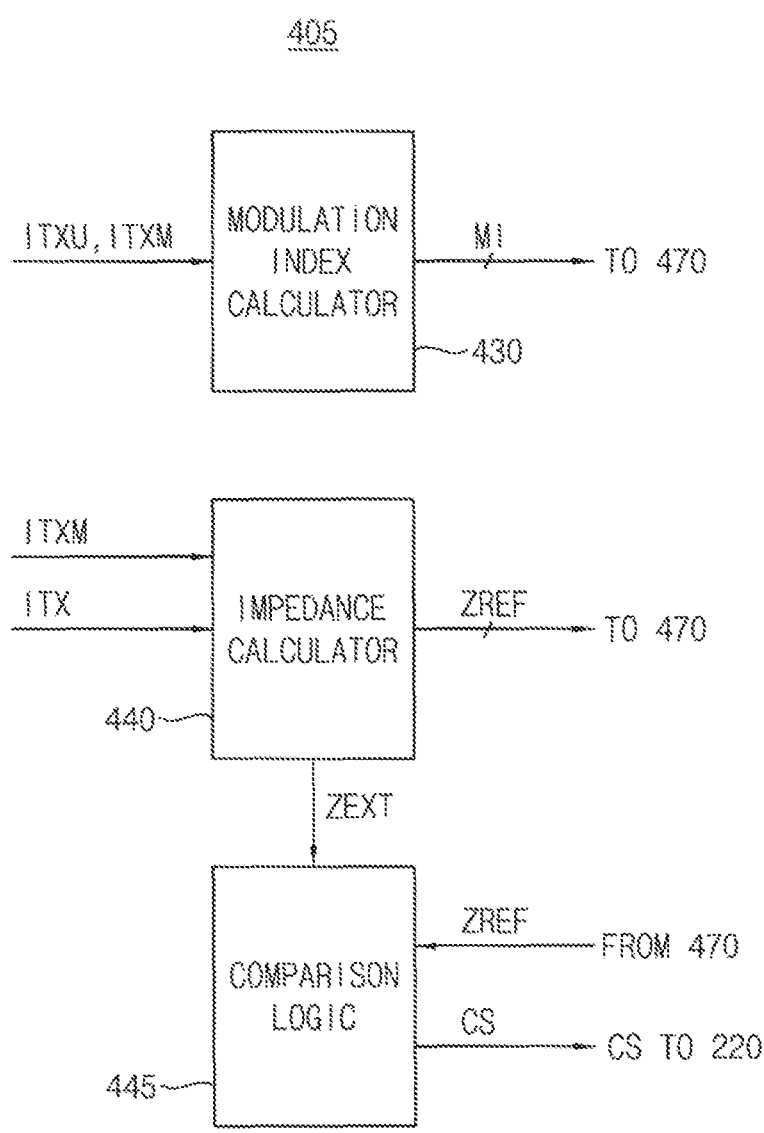
FIG. 9 illustrates an example of the modulation index management firmware in the modulation index setting circuit in FIG. 4 according to some example embodiments.

FIG. 9 illustrates an example of the modulation index management firmware in the modulation index setting circuit in FIG. 4 according to some example embodiments.

Referring to FIG. 9, the modulation index management firmware 405 may include a modulation index calculator 430, an impedance calculator 440 and a comparison logic 445.

The modulation index calculator 430 may calculate the modulation indexes MI based on a reference current ITXU in the non-modulation interval and a modulation current ITXM in the modulation interval.

The modulation indexes MI may be calculated according to equation 1 as follows:

$$MI = (ITXU - ITXM) * 100 / (ITXU + ITXM) \quad \text{[equation 1]}$$

The impedance calculator 440 may calculate a reference external impedance ZREF associated with each of the code values of the driving strength control code DSCD based on the modulation current ITXM in the modulation interval. The impedance calculator 440 may calculate the reference external impedance ZREF based on the modulation current ITXM, a voltage between the first transmission terminal TX1 and the second transmission terminal TX2 and on-resistance of the transmitter 250. The impedance calculator 440 may calculate an external impedance ZEXT based on the transmitter current ITX in the active mode, and may provide the external impedance ZEXT to the comparison logic 445.

The comparison logic 445 may compare the reference external impedance ZREF with the external impedance ZEXT and may provide the processor 220 with a comparison signal CS indicating a result of the comparison of the reference external impedance ZREF with the external impedance ZEXT, for example indicating whether the external impedance ZEXT matches the reference external impedance ZREF. The processor 220 may selectively control the modulation index setting circuit 400 to set the modulation index MI based on the comparison signal CS. When the reference external impedance ZREF matches the external impedance ZEXT, the processor 220 controls the modulation index setting circuit 400 to maintain the modulation indexes MI. When the reference external impedance ZREF does not match the external impedance ZEXT, the processor 220 controls the modulation index setting circuit 400 to regenerate the modulation indexes MI.

In some example embodiments, for example where the modulation index management firmware 405 is implemented by a processor (e.g., 220), each of the modulation index calculator 430, impedance calculator 440 and comparison logic 445 may be implemented by the processor based on the processor executing a program of instructions stored in a memory. Thus, the processor may calculate the modulation indexes associated with the code values of the driving strength control code DSCD based on the reference current IXTU and the modulation current IXTM and may calculate a reference external impedance ZREF of the NFC device 10a, associated with each code value of the driving strength control code DSCD. The processor may, in response to a determination that an NFC tag is within a communication range of the NFC device, calculate an external impedance ZEXT of the NFC device based on the transmitter current ITX that flows in the transmitter 250, and selectively change the code values of the driving strength control code DSCD based on whether the reference external impedance matches ZREF the external impedance ZEXT (e.g., based on a control signal that may be generated, e.g., by processor 220 based on whether the reference external impedance matches ZREF the external impedance ZEXT). The processor may maintain the code values of the driving strength control code DSCD in response to a determination that the reference external impedance ZREF matches the external impedance ZEXT. The processor may change the code values of the driving strength control code DSCD when the reference external impedance ZREF does not match the external impedance ZEXT.

Figure 10A:
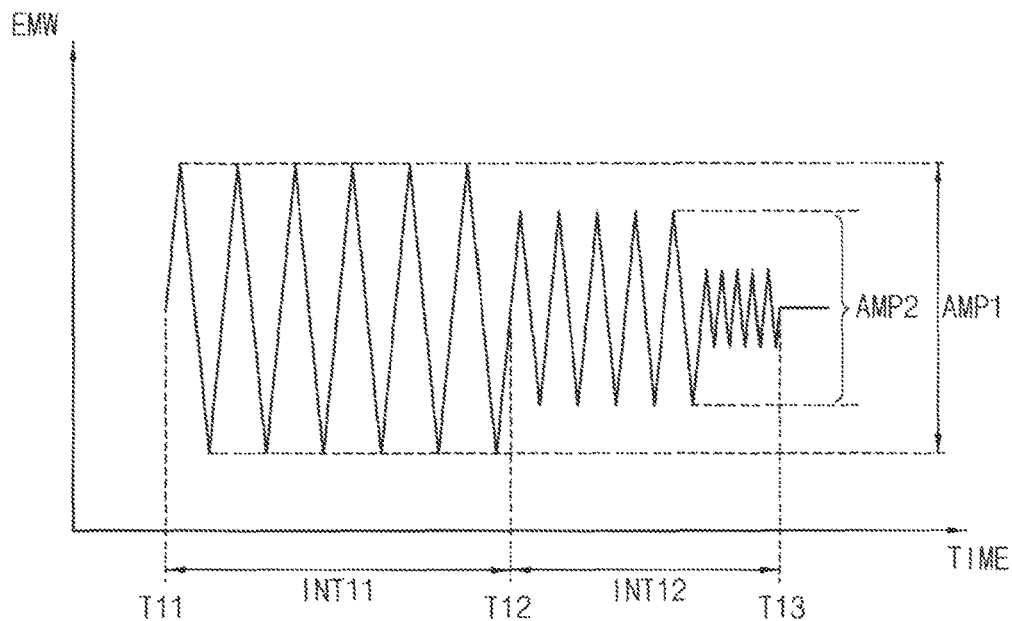
FIG. 10A illustrate a change of amplitude of the electromagnetic wave according to the driving strength control code in the NFC device of FIG. 4 in the stand-by mode and FIG. 10B illustrates a change of a transmitter current according to a change of amplitude in FIG. 10A.
Figure 10B:
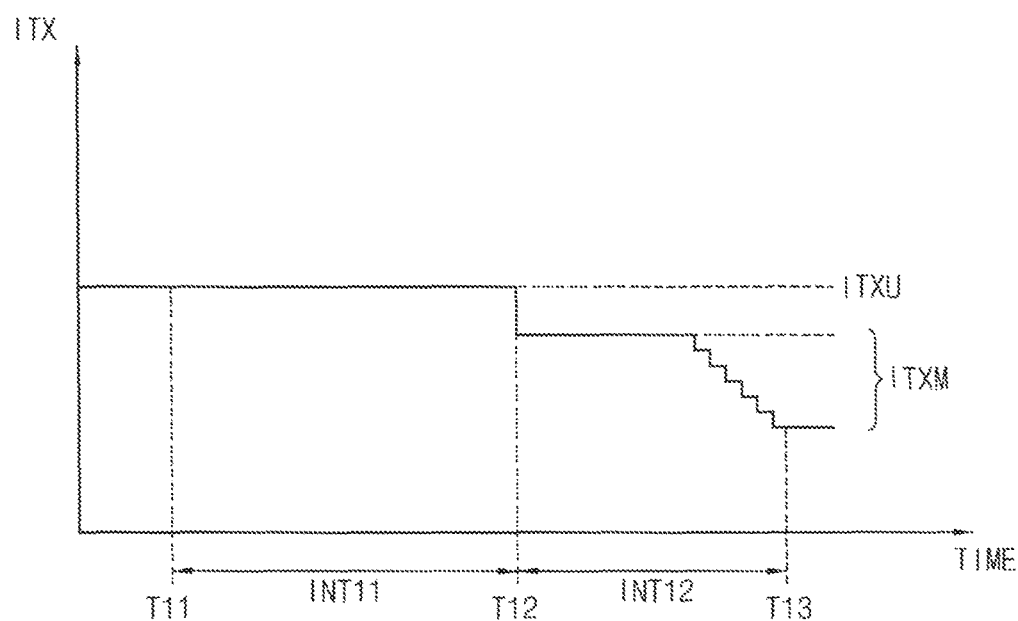

FIG. 10A illustrate a change of amplitude of the electromagnetic wave according to the driving strength control code in the NFC device of FIG. 4 in the stand-by mode and FIG. 10B illustrates a change of a transmitter current according to a change of amplitude in FIG. 10A.

Referring to FIGS. 10A and 10B, when amplitude of the electromagnetic wave EMW varies in response to the driving strength control code DSCD, the transmitter current ITX varies in proportion to the change of the amplitude of the electromagnetic wave EMW. When the electromagnetic wave EMW has an amplitude AMP1 during a first interval INT11 between timing points T11 and T12 corresponding to the non-modulation interval, the transmitter current ITX corresponds to the reference current ITXU. When the electromagnetic wave EMW has an amplitude AMP2 during a second interval INT12 between timing points T12 and T13 corresponding to the modulation interval, the transmitter current ITX corresponds to the modulation current ITXM. The modulation current ITXM may gradually decrease to have zero value.

FIG. 11A illustrate an example of the modulation index table in the modulation index setting circuit in FIG. 4 and FIG. 11B illustrates driving control signals associated with the driving strength control code.

Referring to FIG. 11A, as the driving strength control code DSCD gradually changes from 0xFF to 0x01, the transmitter current ITX gradually decreases, the modulation indexes MI and the reference external impedance ZREF are calculated and the modulation index table 470 is generated.

Referring to FIG. 11B, as the driving strength control code DSCD gradually changes from 0xFF to 0x01, the pull-up driving signals UDS0 and the pull-down driving signals DDS1 gradually changes. In some example embodiments, as the driving strength control code DSCD gradually changes from 0xFF to 0x01, the pull-up driving signals UDS1 and the pull-down driving signals DDS0 may gradually change.

Restated, where a processor (e.g., 220) implements the modulation index management firmware 405, the processor may gradually and/or sequentially change a magnitude of the modulation current ITXM during the modulation interval based on gradually and/or sequentially changing the code values of the driving strength control code DSCD.

Figure 12:
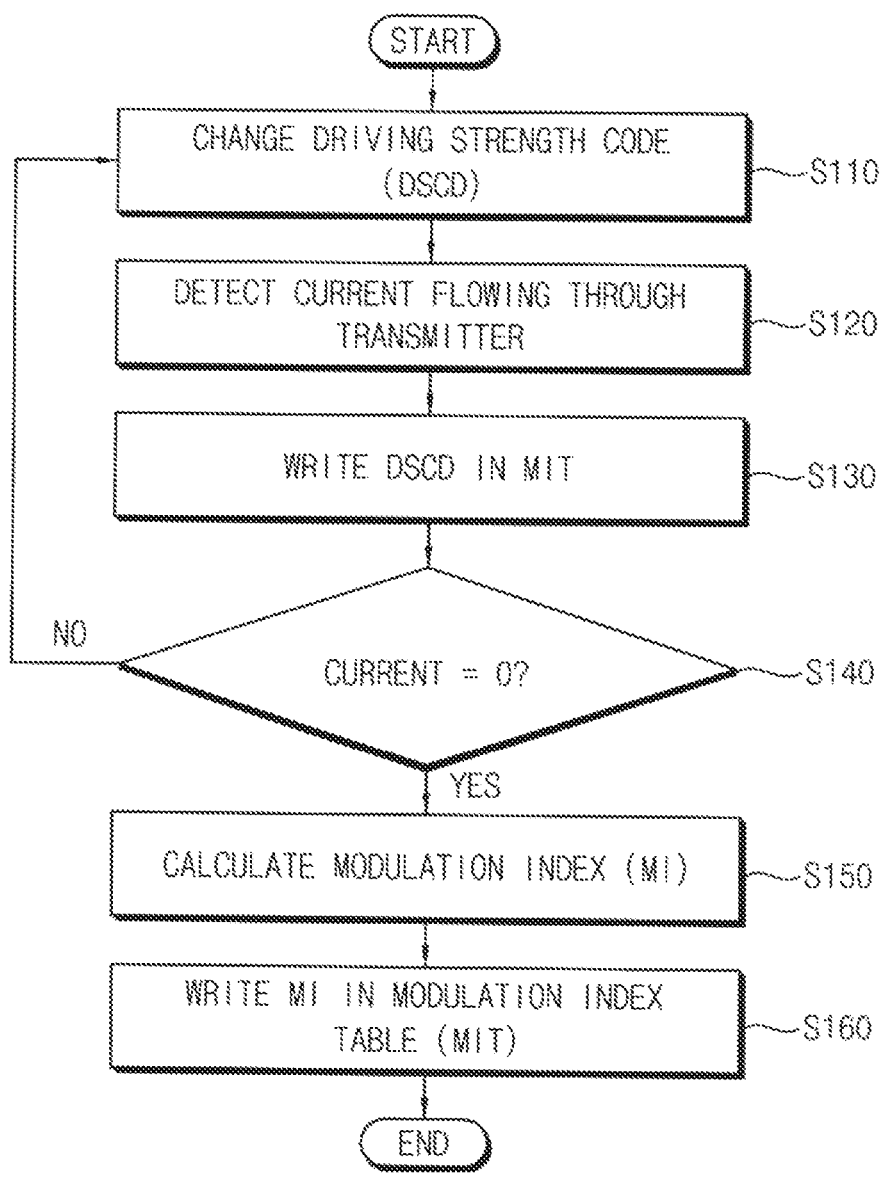
FIG. 12 is a flow chart illustrating operation of the modulation index setting circuit in FIG. 4 according to some example embodiments.

FIG. 12 is a flow chart illustrating operation of the modulation index setting circuit in FIG. 4 according to some example embodiments.

Referring to FIGS. 4, 5 and 8 through 12, the modulation index management firmware 405 changes the driving strength control code DSCD (S110), the current detector 410 detects the transmitter current ITX to provide the detected transmitter current to the modulation index management firmware 405 (S120), the modulation index calculator 430 in the modulation index management firmware 405 stores the modulation index MI in the modulation index table 470 (S130). The current detector 410 determines whether the transmitter current ITX is zero (S140). When the transmitter current ITX is not zero (NO in S140), the operations S110, S120 and S130 are repeated. When the transmitter current ITX is zero (YES in S140), the modulation index calculator 430 calculates the modulation indexes MI associated with code values of the driving strength control code DSCD based on the reference current ITXU and the modulation current ITXM stored in the modulation index table 470 (S150), and stores the modulation indexes MI in the modulation index table 470 (S160).

Figure 13:
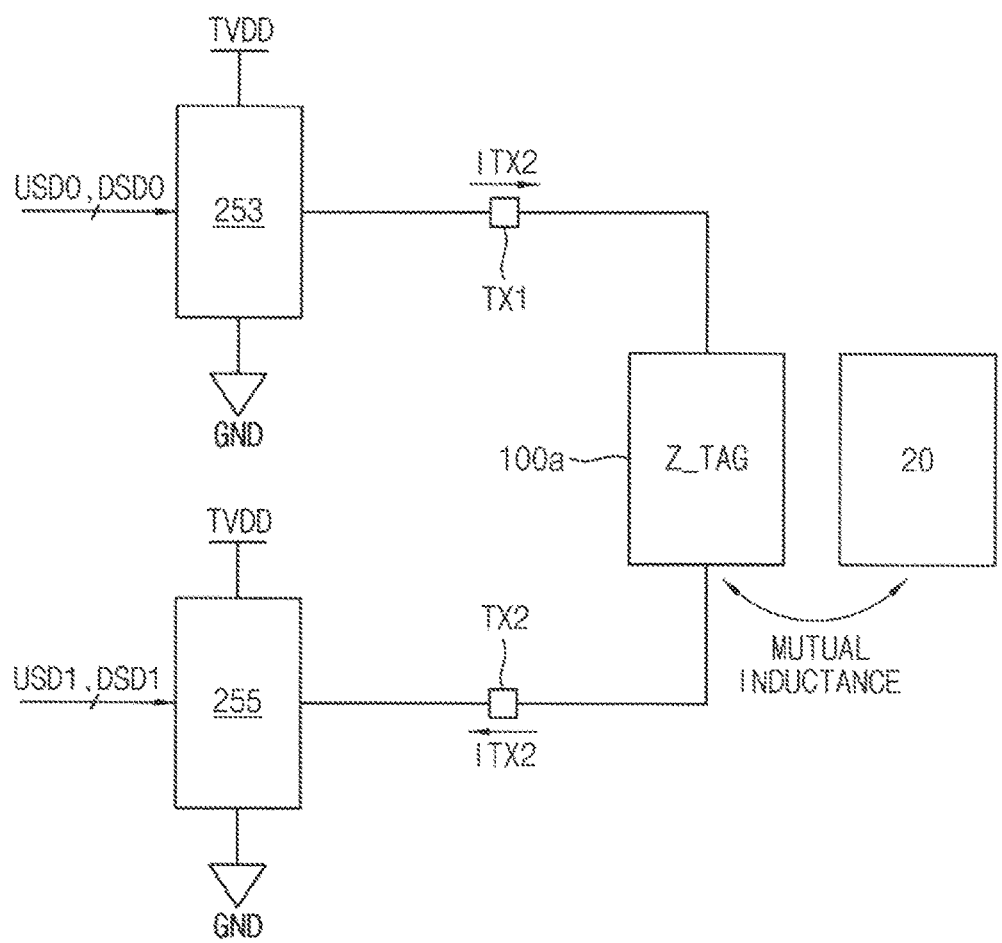
FIG. 13 illustrates operation of a portion of the NFC device of FIG. 4.

FIG. 13 illustrates operation of a portion of the NFC device of FIG. 4.

FIG. 13 illustrates an example that the NFC tag 20 is within the communication range of the NFC device 10*a*.

Referring to FIGS. 4, 5 and 13, when the NFC device 20 is within the communication range of the NFC device 10*a*, a second transmitter current ITX2 flows from the first driver 253 of the transmitter 250, through the first transmission terminal TX1, the resonance circuit 100*a*, and the second transmission terminal TX2, to the second driver 255 of the transmitter 250. In this case, the resonance circuit 100*a* interacts with the resonance circuit 510 of the NFC tag 20, that is, mutual inductance occurs between the resonance circuit 100*a* and the resonance circuit 510, and the impedance of the resonance circuit 100*a*, corresponding to Z_TAG, decreases compared to the impedance of Z_NO-TAG.

As the impedance of the resonance circuit 100*a* changes, the modulation index MI may also change. The modulation index setting circuit 400 detects the transmitter current ITX flowing in the transmitter 250, calculates an external impedance based on the transmitter current ITX when the NFC tag 20 within a communication range of the NFC device 10*a*, and provides the processor 220 with the comparison signal CS indicating whether the external impedance matches the reference external impedance. Restated, for example where a processor (e.g., 220) implements at least the modulation index management firmware 405, the processor may compare the reference external impedance with the external impedance and generate a comparison signal CS indicating a result of the comparison. The processor 220 may control the modulation index setting circuit 400 to selectively perform calculation of the modulation index, based on the comparison signal CS. After selectively perform calculation of the modulation index, the NFC device 10*a* performs a modulation and communicates with the NFC tag 20.

Figure 14A:
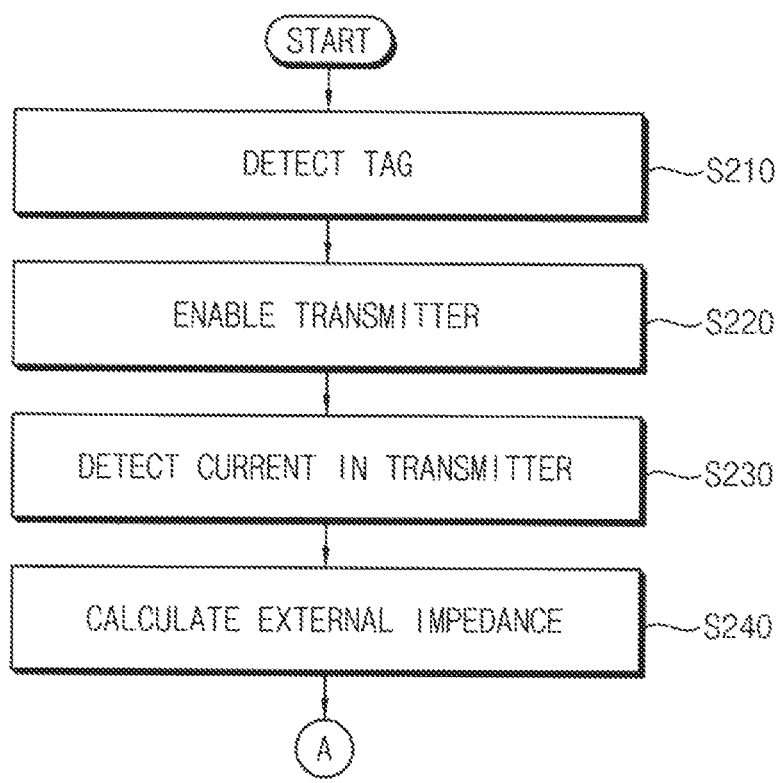
FIGS. 14A and 14B are flow charts illustrating operation of the NFC device of FIG. 4 when an NFC tag is within a communication range of the NFC device.
Figure 14B:
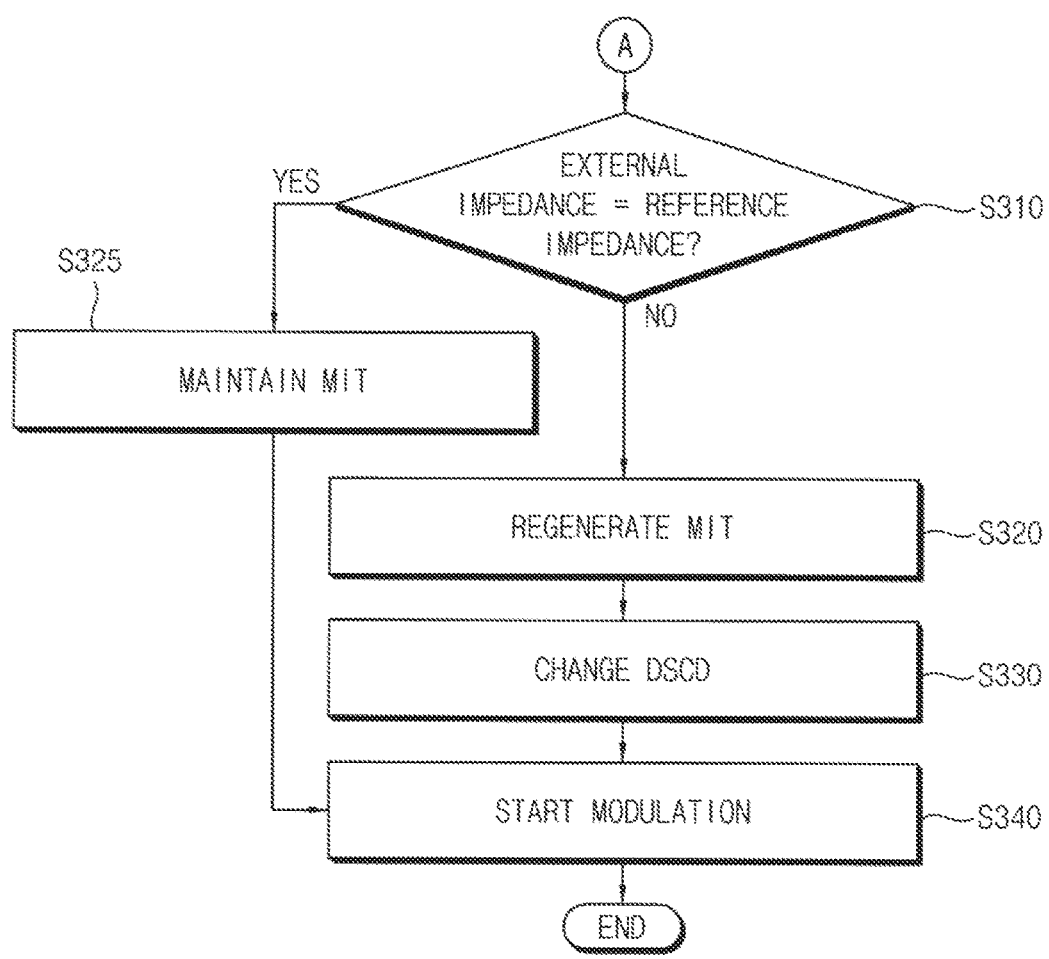

FIGS. 14A and 14B are flow charts illustrating operation of the NFC device of FIG. 4 when an NFC tag is within a communication range of the NFC device.

Referring to FIGS. 4, 5, 8 through 12, 14A and 14B, the tag detector 300 detects the NFC tag 20 to provide a detection signal DS to the processor 220 (S210). The processor 220 activates the transmitter 250 in response to the detection signal DS (S220). The modulation index setting circuit 400 drives the transmitter 250 with one of the code values of the driving strength control code DSCD and detects the transmitter current ITX (S230).

The modulation index setting circuit 400 calculates the external impedance ZEXT with respect to a voltage between the first transmission terminal TX1 and the second transmission terminal TX2 based on the detected transmitter current ITX (S240). The comparison logic 445 in the modulation index setting circuit 400 compares the external impedance ZEXT with the reference impedance ZREF corresponding to the code value and provides the processor 220 with a comparison signal CS indicating a result of the comparison (S310).

When the external impedance ZEXT matches the reference impedance ZREF (YES in S310) as a result of the comparison, which indicates that the impedance of the resonance circuit 100*a* is not changed, the processor 220 controls the modulation index setting circuit 400 such that the modulation index management firmware 405 maintains the modulation index table 470 (S325).

When the external impedance ZEXT does not match the reference impedance ZREF (NO in S310) as a result of the comparison, which indicates that the impedance of the resonance circuit 100*a* has changed, the processor 220 controls the modulation index setting circuit 400 to set the modulation indexes MI again and to regenerate the modulation index table 470 (S320) and changes the driving strength control code DSCD by referring to the modulation index table 470 (S330). After the driving strength of the transmitter 250 is changed, the modulator 242 starts modulation operation (S340).

Figure 15:
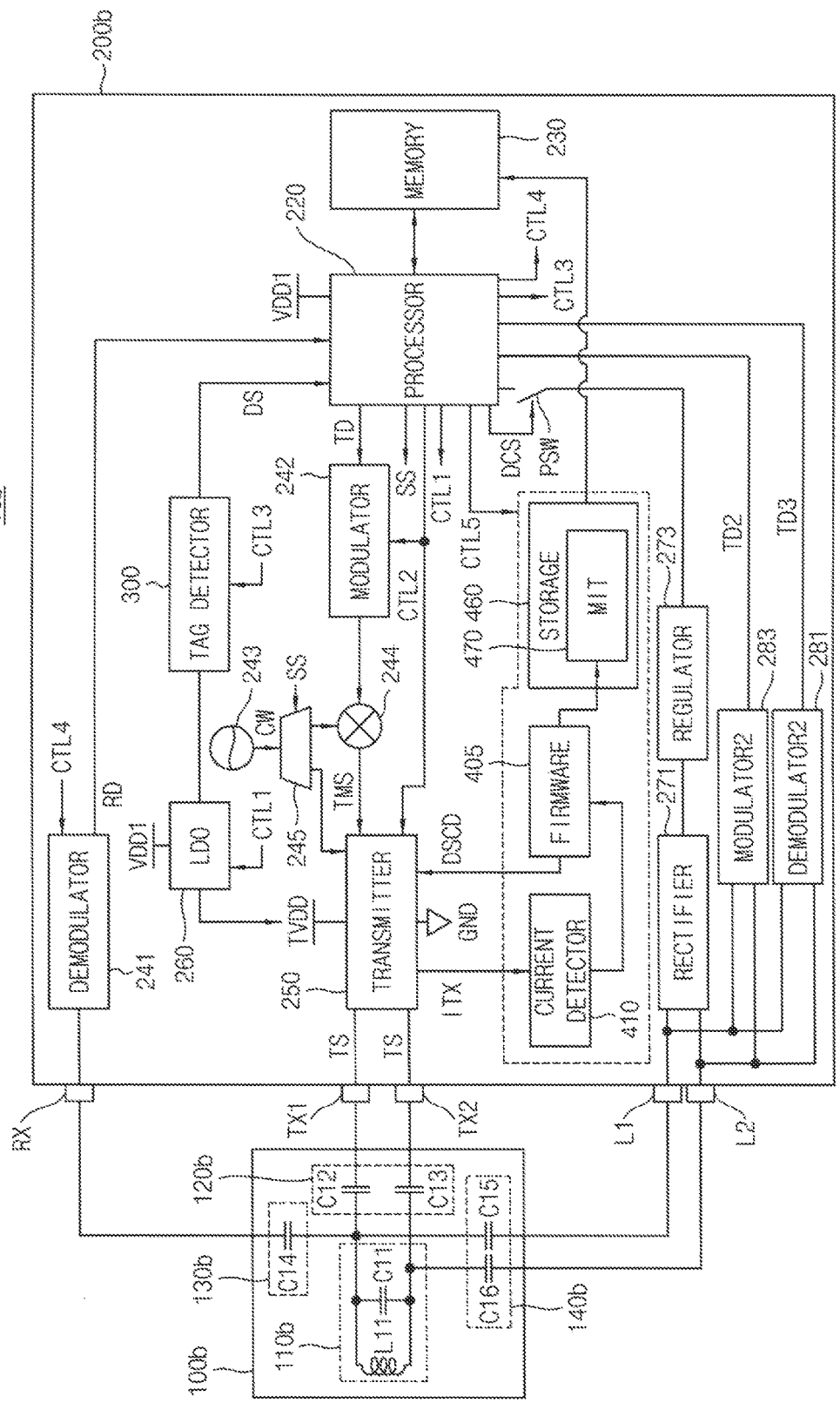
FIG. 15 is a block diagram illustrating another example of the NFC device of FIG. 1 according to some example embodiments.

FIG. 15 is a block diagram illustrating another example of the NFC device of FIG. 1 according to some example embodiments.

Elements used to operate an NFC device 10*b* in the reader mode as well as elements used to operate the NFC device 10*b* in the card mode are illustrated in FIG. 15.

Referring to FIG. 15, the NFC device 10*b* may include a resonance circuit 100*b* and an NFC chip 200*b*.

The NFC chip 200*b* may be connected to the resonance circuit 100*b* through a first power terminal L1, a second power terminal L2, a first transmission terminal TX1, a second transmission terminal TX2, and a reception terminal RX.

The resonance circuit 100*b* may include a resonance unit 110*b* having an antenna L11 and a first capacitor C11 and a matching circuit 120*a*, connected to the resonance unit 110*b*, the first transmission terminal TX1 and the second transmission terminal TX2, and having a second capacitor C12 and a third capacitor C13 to performing an impedance matching, a first filter 130*b*, connected to the resonance unit 110*b* and the reception terminal RX and having a fourth capacitor C14 and a second filter 140*b*, connected to the resonance unit 110*b*, the first power terminal L1 and the second power terminal L2, and having a fifth capacitor C15 and a sixth capacitor C16.

The NFC chip 200*b* may perform the signal transmission operation and the signal reception operation through the first power terminal L1 and the second power terminal L2 in the card mode, perform the signal transmission operation through the first transmission terminal TX1 and the second transmission terminal TX2 in the reader mode, and perform the signal reception operation through the reception terminal RX in the reader mode.

The NFC chip 200b may include a processor 220, a memory 230, a first demodulator 241, an oscillator 243, a mixer 244, a demultiplexer 245, a transmitter 250, a regulator 260, a tag detector 300, a rectifier 271, a regulator 273, a power switch PSW, a second demodulator 281, a second modulator 283 and a modulation index setting circuit 400.

The processor 220, the memory 230, the first demodulator 241, the oscillator 243, the mixer 244, the demultiplexer 245, the transmitter 250, the regulator 260, the tag detector 300 and the modulation index setting circuit 400 may be equivalent to corresponding components in the NFC device 10a of FIG. 4.

The first demodulator 241 generates a first reception data RD1 and the first modulator 242 modulates a first transmission data TD1. The processor 220 provides a power control signal PCS to the power switch PSW to control a switching operation of the power switch PSW.

When the signal reception operation is performed in the card mode, the second demodulator 281 generates a second reception data RD2 by demodulating the signal supplied from the resonance circuit 100b through the first and second power terminals L1 and L2 to provide the second reception data RD2 to the processor 220. The processor 220 may decode the second reception data RD2 and may store some or all of the second reception data RD2 in the memory 230.

When the signal transmission operation is performed in the card mode, the processor 220 may read out the output data from the memory 230 and encodes the output data to provide a second transmission data TD2 to the second modulator 283 and the second modulator 283 modulates the second transmission data TD2 to provide a modulation signal to the first and second power terminals L1 and L2.

Figure 16:
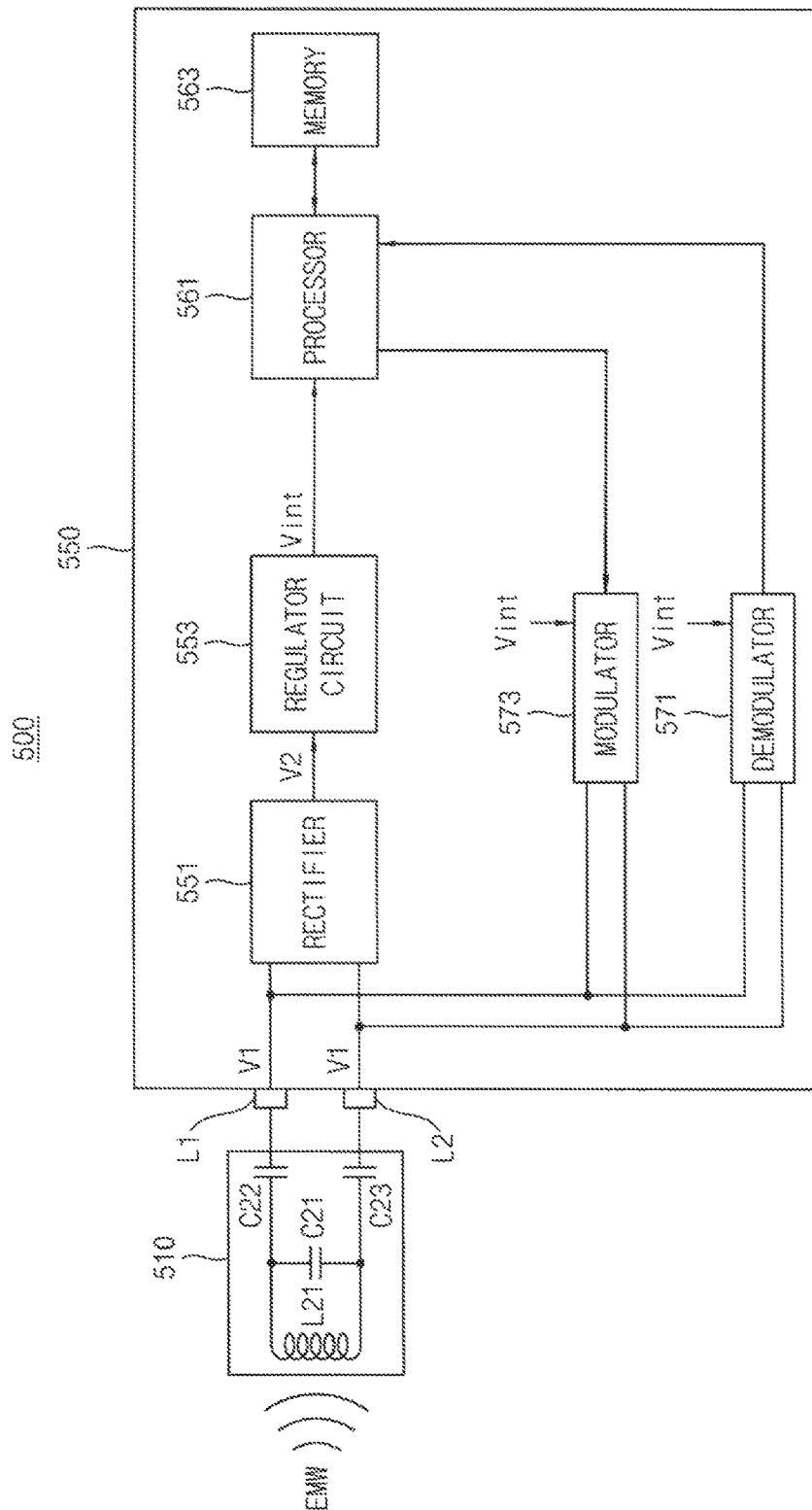
FIG. 16 is a block diagram illustrating an example of the NFC tag in FIG. 1 according to some example embodiments.

FIG. 16 is a block diagram illustrating an example of the NFC tag in FIG. 1 according to some example embodiments.

Referring to FIG. 16, the NFC tag 20 may include a resonance circuit 510 and an NFC tag chip 550.

The NFC tag chip 550 may be connected to the resonance circuit 510 through first and second power terminals L1 and L2.

The resonance circuit 510 may include a resonance unit including an antenna L21 and a first capacitor C21, second and third capacitors C22 and C23 through which transfers induced voltage induced in response to electromagnetic wave EMW to the first and second power terminals L1 and L2, and a filter including a third capacitor C23. The resonance circuit 510 may transfer the induced voltage in response to electromagnetic wave EMW as a first voltage V1 to the NFC tag chip 550.

The NFC tag chip 550 may receive the first voltage V1 from the resonance circuit 510 through the first and second power terminals L1 and L2. The NFC tag chip 550 may include a rectifier 551, a regulation circuit 553, a processor 561, a memory 563, a demodulator 571 and a modulator 573.

The rectifier 551 rectifies the first voltage V1 to generate a second voltage V2 that is direct-current (DC) voltage. The regulation circuit 553 may generate, to the processor 561, the demodulator 571 and the modulator 573, an internal voltage Vint with a regular level, which is used in the NFC tag chip 550. The processor 561 may control overall operations of the NFC tag chip 550.

When a reception operation is performed, the demodulator 571 may demodulate a signal provided through the first and second power terminals L1 and L2 from the resonance circuit 510 to generate input data and may provide the input data to the processor 561. The processor 561 may store the input data in the memory 563. When a transmission operation is performed, the processor 561 may read out output data from the memory 563 to provide the output data to the modulator 573. The modulator 573 may modulate the output data to provide a modulated signal to the first and second power terminals L1 and L2. For example, the modulator 573 may perform a load modulation for the output data to generate the modulated signal.

Figure 17:
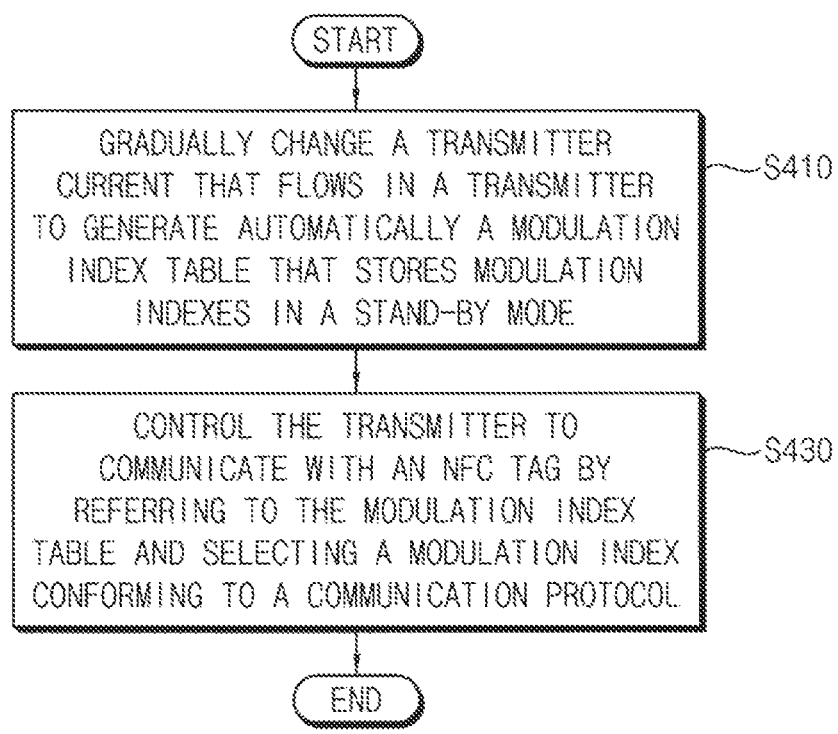
FIG. 17 is a flow chart illustrating a method of detecting a tag in an NFC device according to some example embodiments.

FIG. 17 is a flow chart illustrating a method of detecting a tag in an NFC device according to some example embodiments.

Referring to FIGS. 4 through 17, in a method of operating an NFC device 10a according to some example embodiments, the modulation index setting circuit 400 gradually changes the transmitter current ITX flowing in the transmitter 250 by applying a driving strength control code DSCD to the transmitter 250, to generate automatically the modulation index table 470 that stores the modulation indexes MI associated with code values of the driving strength control code DSCD based on transmitter current ITX in a stand-by mode (S410).

The processor 220 selects a first modulation index of the modulation indexes MI by referring to the modulation index table 470, which conforms to a communication protocol between the NFC tag 20 and the NFC device 10a in an active mode in which the NFC tag 20 is within a communication range of the NFC device 10a, the processor 220 controls the NFC device 10 to communicate with the NFC tag 20 by controlling the modulation index setting circuit 400 to provide the transmitter 250 with the driving strength control code DSCD associated with driving strength corresponding to the selected first modulation index (S430).

Therefore, according to some example embodiments, the NFC device 10 may adaptively set a target modulation index by automatically calculating the modulation indexes associated with the code values of the driving strength control code DSCD that determines the driving strength of the transmitter 250, storing the modulation indexes in the modulation index table 470 and applying the driving strength control code DSCD according to one of communication protocols such as type A, type B and type F between the NFC tag 20 and the NFC device 10 when the NFC device 10 communicates with the NFC tag 20. Therefore, the NFC device 10 may enhance performance.

Figure 18:
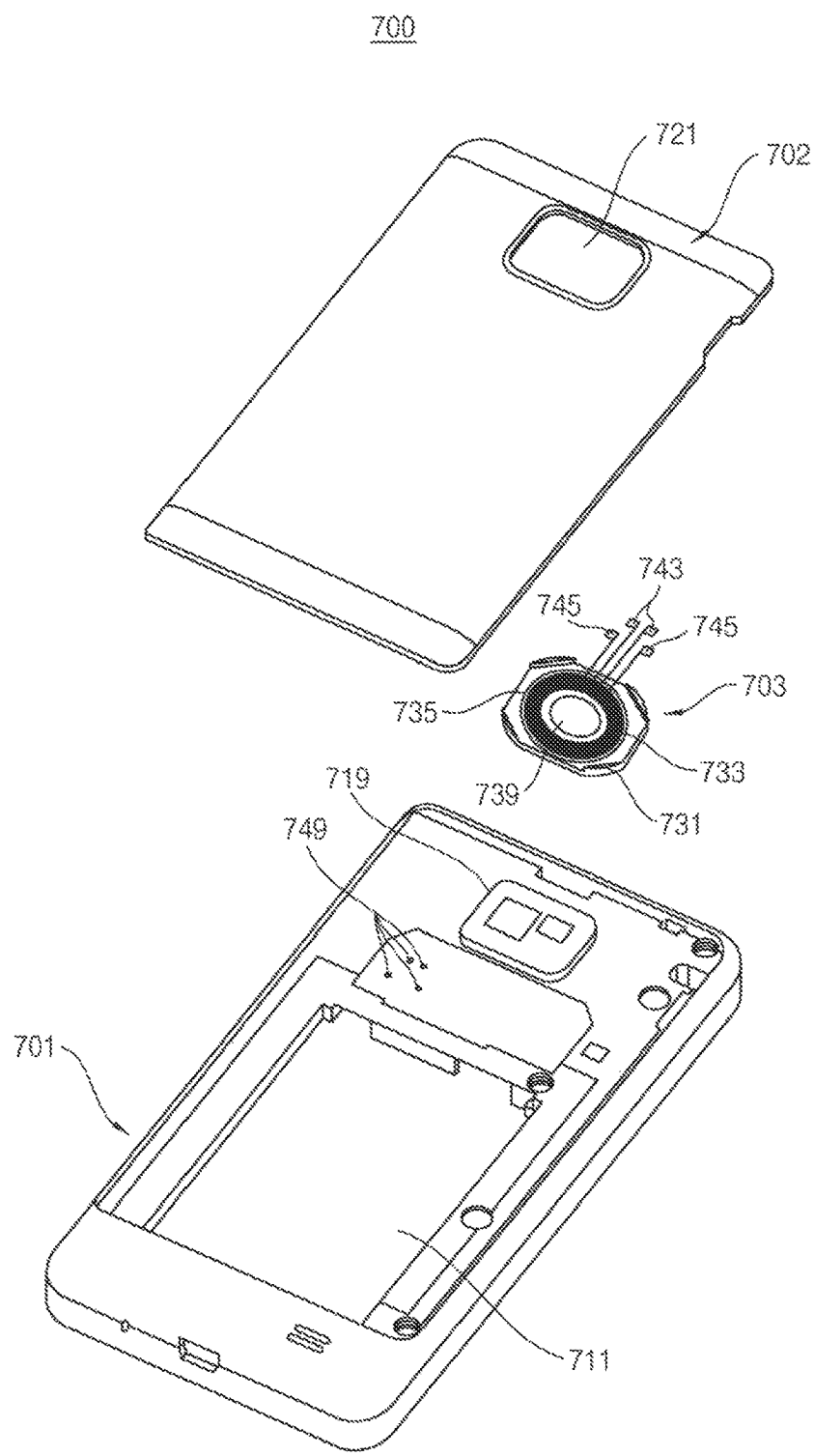
FIG. 18 is an exploded perspective view of a portable terminal, also referred to as a mobile device, (for example a "smart-phone") according to some example embodiments.

FIG. 18 is an exploded perspective view of a portable terminal, also referred to as a mobile device, (for example a "smart-phone") according to some example embodiments.

Figure 19:
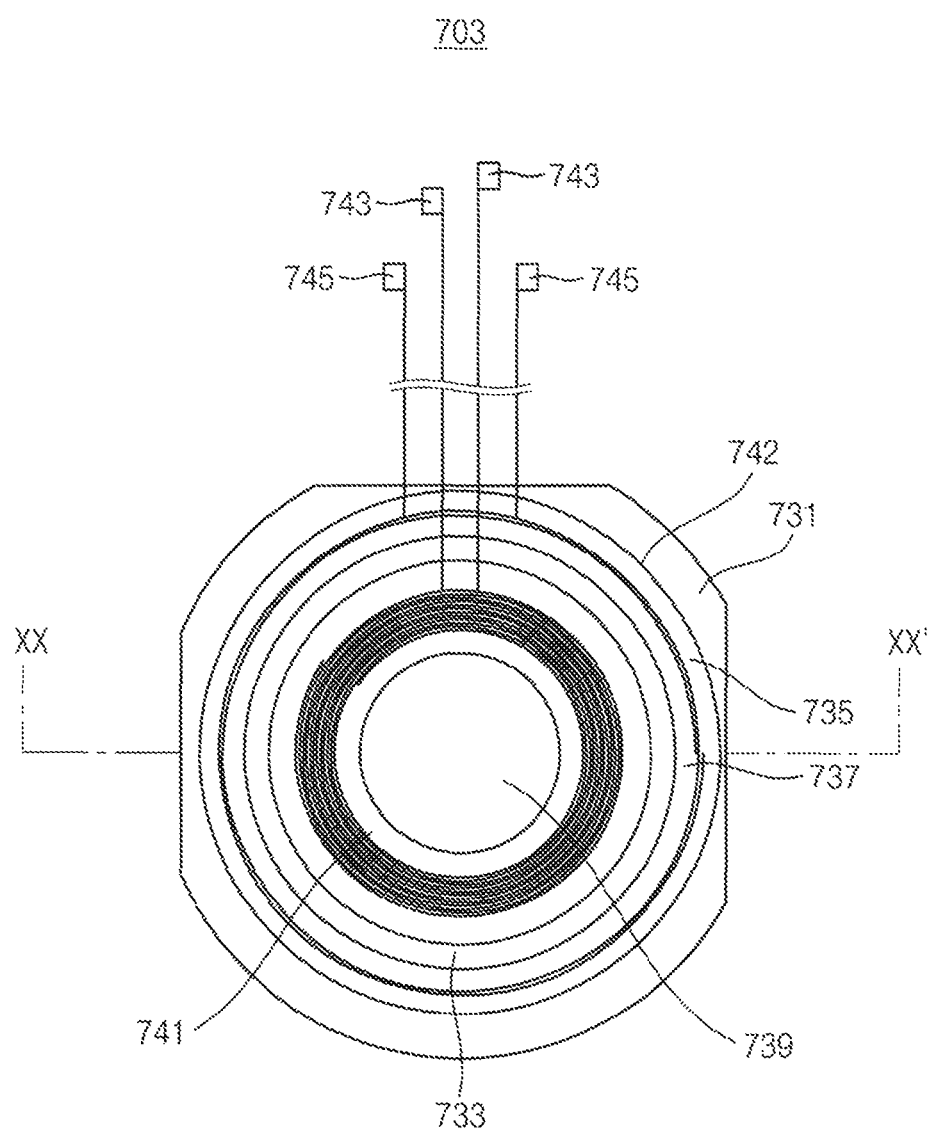
FIG. 19 is a plan view of a coil module in the mobile device of FIG. 18.

FIG. 19 is a plan view of a coil module in the mobile device of FIG. 18.

Figure 20:
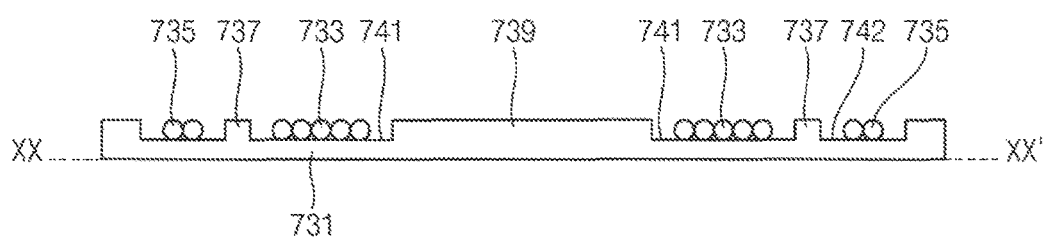
FIG. 20 is a cross-sectional view of the coil module in FIG. 19 taken along XX-XX'.

FIG. 20 is a cross-sectional view of the coil module in FIG. 19 taken along XX-XX'.

Referring to FIG. 18, FIG. 19 and FIG. 20, a portable terminal 700 includes a shielding member 731 attached to an inner surface of an external part such as a battery cover 702 or a housing 701, and a pair of coils 733 and 735 attached to the shielding member 731. The coils 733 and 735 are mounted on a same plane. The shielding member 731 and the coils 733 and 735 are collectively referred to herein as a coil module 703.

Referring to FIG. 18, the portable terminal 700 is a bar type terminal having a touch screen display. Other types of terminals are envisioned within the scope of this disclosure, including different physical form factors and display types. While not shown, the display, function keys (such as Start/

End and Select keys), a transmitter, and a receiver are installed on a front surface of the housing 701.

The housing 701 is provided on a rear surface of the portable terminal 700, with a battery mounting recess 711 for accommodating a battery pack. The battery cover 702 covers the battery mounting recess 711. A plurality of terminals 749 and a camera module 719 are installed at one side of the battery mounting recess 711, with the terminals 749 also being covered by the battery cover 702. An opening 721 penetrates through both surfaces of the battery cover 702. The camera module 719 is accommodated in the opening 721, thereby securing a capturing path. At least one of a connector terminal, a memory slot, a volume key, and a camera shutter switch (not shown) may be arranged on a side surface of the housing 701.

Figure 21:
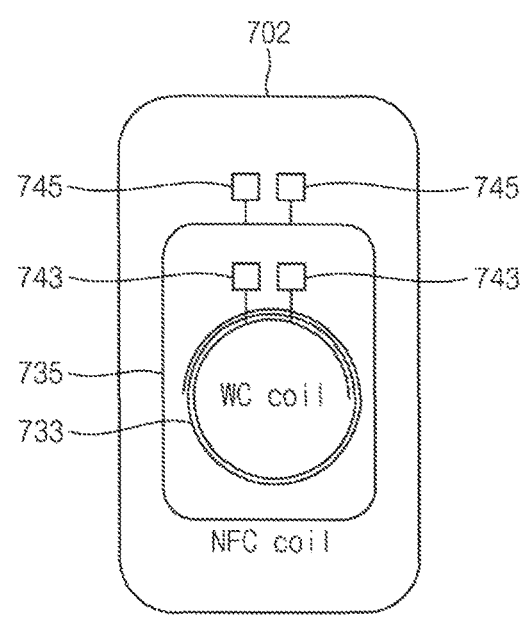
FIG. 21 illustrates mounting of the coil module of FIG. 19 to a battery cover of the portable terminal according to some example embodiments.
Figure 22:
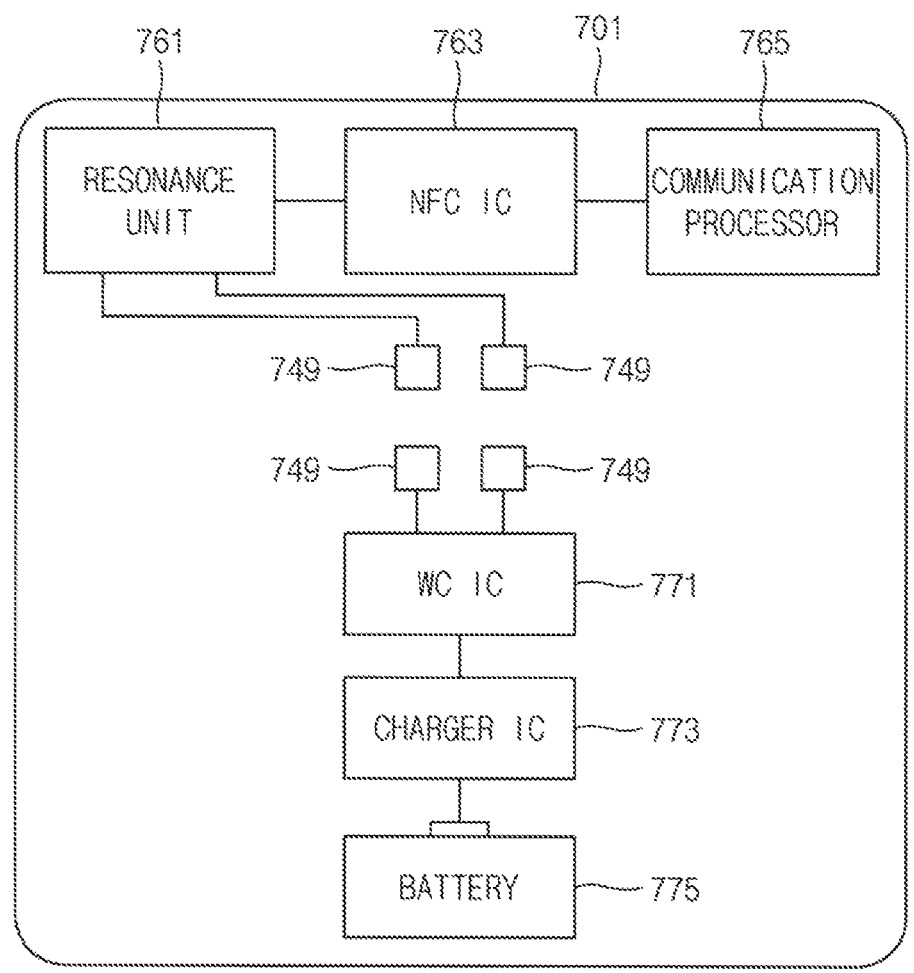
FIG. 22 is a schematic view of the portable terminal of FIG. 20, with which the battery cover illustrated in FIG. 21 is combinable.

The coil module 703 is attached to the inner surface of the battery cover 702 and is connected to the circuits of the portable terminal 700, (e.g. a communication circuit or a charging circuit) via the plurality of terminals 749. As illustrated in FIG. 20, FIG. 21 and FIG. 22, the coil module 703 includes the shielding member 731 and the coils 733 and 735.

The shielding member 731 may be formed by injection molding, having first and second accommodation grooves 741 and 742 respectively on a surface thereof. The first and second accommodation grooves 741 and 742 respectively are circular in shape and recessed into one surface of the shielding member 731. The second accommodation groove 742 surrounds the first accommodation groove 741, being concentric with the first accommodation groove 741. A shielding wall 737 is interposed between the first and second accommodation grooves 741 and 742.

As stated above, the shielding member 731 contains the iron component which prevents mutual interference between the coils 733 and 735, and prevents the coils 733 and 735 from impacting circuits within the portable terminal 700, caused by electronic waves generated from high-frequency waves, low-frequency waves, or power applied to the coils 733 and 735.

As illustrated in FIGS. 19 and 20, the first coil 733 is accommodated in the first accommodation groove 741 and the second coil 735 is accommodated in the second accommodation groove 742. The first coil 733 and the second coil 735 are formed by spirally winding enamel-insulated conductor wires.

The first coil 733 and the second coil 735 are accommodated in the first and second accommodation grooves 741 and 742, respectively, and the second coil 735 surrounds the first coil 733. Herein, the shielding wall 737 between the first coil 733 and the second coil 735 provides a shielding effect between the coils. In other words, the shielding wall 737 shields interference of electronic waves between the first and second coils 733 and 735 respectively. The first coil 733 and the second coil 735 have connection ends 743 and 745, respectively, extended from one side of the shielding member 731. The connection ends 343 and 345 are connected to circuits of the portable terminal 700 via the plurality of terminals 749 provided on the housing 701.

When installed, the first coil 733 and the second coil 735 are exposed from one surface of the shielding member 731. However, the first coil 733 and the second coil 735 face the inner surface of the battery cover 702 when the shielding member 731 is attached to the battery cover 702, thereby covering the first and second coils 733 and 735 respectively. Consequently, the first coil 733 and the second coil 735 are covered by the shielding member 731 and the battery cover 702.

One of the first and second coils 733 and 735 respectively may be used as a secondary coil for wireless charging and the other coil may be used as an NFC antenna element. The coils 733 and 735 may also be used as antennas for short-range wireless communication, (e.g. Bluetooth or terrestrial multimedia broadcasting antennas). Some example embodiments of the inventive concepts utilize the first coil 733 as a secondary coil for wireless charging and utilize the second coil 735 as an NFC antenna element.

For wireless charging, the portable terminal 700 may be cradled on a charging cradle (not shown) to align a primary coil of a charger with the secondary coil of the portable terminal 700 corresponding to the first coil 733. Alternatively, the primary coil is movably mounted in the charging cradle such that when the portable terminal 700 is positioned on the charging cradle, the primary coil is moved to align with the portable terminal 700.

To align the primary coil of the charging cradle with the first coil 733 of the portable terminal 700, the shielding member 731 may have a protrusion portion 739. The protrusion portion 739 protrudes from the first accommodation groove 741 of the shielding member 731. Because the shielding member 731 contains the iron component, the protrusion portion 739 also contains an iron component. That is, because the protrusion portion 739 contains a paramagnetic material, (e.g. the iron component), when the protrusion portion 739 is positioned within the magnetic field of a permanent magnet, an attraction force of the permanent magnet pulls on the protrusion portion 739.

The permanent magnet is attached to the primary coil of the charging cradle. When the portable terminal 700 is mounted on the charging cradle, the attraction force between the permanent magnet and the shielding member 731, (particularly the protrusion portion 739), aligns the primary coil of the charging cradle with the first coil 733 of the portable terminal 700. Furthermore, while the protrusion portion 739 contains the iron component and thus has a paramagnetic property, the protrusion portion 739 may have an additional magnetic portion attached on the first accommodation groove 741 to increase the attraction force between the permanent magnet of the primary coil and the shielding member 731. Preferably, the additional magnetic portion is formed of a paramagnetic material.

FIG. 21 illustrates mounting of the coil module of FIG. 19 to a battery cover of the portable terminal according to some example embodiments.

FIG. 22 is a schematic view of the portable terminal of FIG. 20, with which the battery cover illustrated in FIG. 21 is combinable.

FIG. 21 and FIG. 22 illustrate configurations of a portable terminal that implements both a wireless charging function and an NFC function using the coil module 703, with the first coil 733 as a secondary coil used for wireless charging and the second coil 735 as an antenna element for NFC, by way of example.

FIG. 21 illustrates mounting of the coil module 703 on the battery cover 702 of the portable terminal 700 and FIG. 22 illustrates the housing 701 to be combined with the battery cover 702 illustrated in FIG. 21.

To implement the wireless charging function and the NFC function using the first and second coils 733 and 735 respectively, the coils 733 and 735 are connected to a communication processor 765 and a charger integrated circuit (IC) 773, respectively. A resonance circuit 761 and an NFC IC 763 or a wireless charger (WC) IC 771 is disposed on a connection of the first coil 733 or the second coil 735 to a circuit of the portable terminal 700. These ICs control current and voltage during charging. The resonance circuit 761 may employ the resonance circuit 100a of FIG. 4 or the resonance circuit 100b of FIG. 16, and the NFC IC 763 may employ the NFC chip 200a of FIG. 4 or the NFC chip 200b of FIG. 16. Therefore, the NFC IC 763 may determine whether an NFC tag is within a communication range of the NFC IC 763 by monitoring a current flowing in a regulator that provides a transmission power supply voltage to a transmitter in the stand-by mode.

According to some example embodiments, including the example embodiments shown in FIG. 21 and FIG. 21, the NFC IC 763 is connected to the communication processor 765 of the portable terminal 700 and to the second coil 735 mounted to the battery cover 702 via the plurality of terminals 749. The charger IC 773 is installed inside the portable terminal 700 and connected to the battery pack 775. In addition, the WC IC 771 is connected to the charger IC 773 inside the portable terminal 700 and to the first coil 733 mounted to the battery cover 702 through the remaining plurality of terminals 749.

Figure 23:
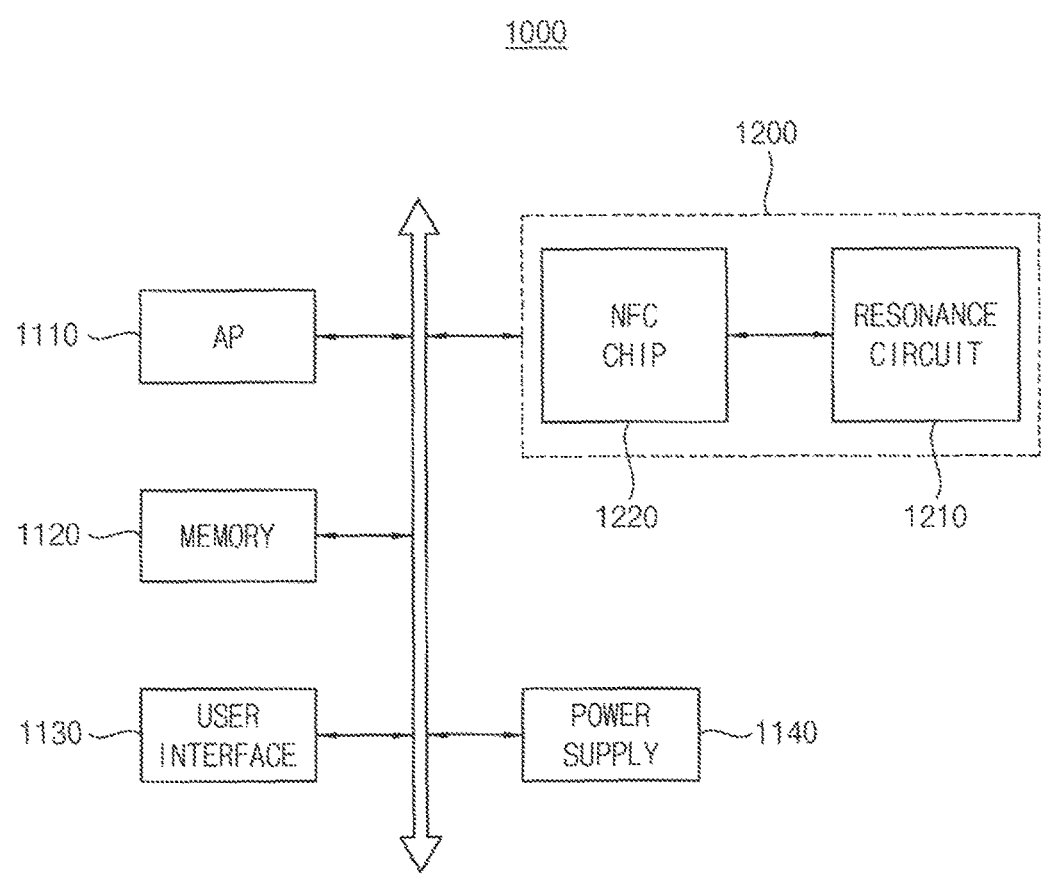
FIG. 23 is a block diagram illustrating an electronic device according to some example embodiments.

FIG. 23 is a block diagram illustrating an electronic device according to some example embodiments.

Referring to FIG. 23, an electronic device 1000 includes an application processor 1110, an NFC device 1200, a memory device 1120, a user interface 1130 and a power supply 1140.

The application processor 1110 may control overall operations of the electronic device 1000. The memory device 1120 may store data required for an operation of the electronic device 1000. For example, the memory device 1120 may store a boot image for booting the electronic device 1000, output data to be outputted to an external device and input data received from the external device.

The NFC device 1200 may provide the output data stored in the memory device 1120 to the external device through NFC and store the input data received from the external device through NFC into the memory device 1120. The NFC device 1200 may include a resonance circuit 1210 and an NFC chip 1220. The resonance circuit 1210 may employ the resonance circuit 100a of FIG. 4 or the resonance circuit 100b of FIG. 16, and the NFC chip 1220 may employ the NFC chip 200a of FIG. 4 or the NFC chip 200b of FIG. 15. Therefore, the NFC chip 1220 may automatically set modulation indexes associated with a driving strength control code in the stand-by mode.

The user interface 1130 may include at least one input device, such as a keypad or a touch screen, and at least one output device, such as a speaker or a display device. The power supply 1140 may supply a power supply voltage to the electronic device 1000.

In some example embodiments, the electronic device 1000 and/or components of the electronic device 1000 may be packaged in various forms.

The some example embodiments may be employed in an electronic device including an NFC device.

The foregoing is illustrative of the present inventive concepts and is not to be construed as limiting thereof. Although a few some example embodiments have been described, those skilled in the art will readily appreciate that many modifications are possible in the some example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various some example embodiments and is not to be construed as limited to the specific some example embodiments disclosed, and that modifications to the disclosed some example embodiments, as well as other some example embodiments, are intended to be included within the scope of the appended claims.

What is claimed is:

1. A modulation index setting circuit of a near field communication (NFC) device, the modulation index setting circuit comprising:
   a current detector configured to generate a reference current based on detecting a transmitter current flowing in a transmitter of the NFC device during a non-modulation interval, the current detector further configured to generate a modulation current based on detecting the transmitter current flowing in the transmitter of the NFC device during a modulation interval;
   a storage device storing a program of instructions; and
   a processor configured to execute the program of instructions to
      change the transmitter current based on applying a driving strength control code to the transmitter,
      receive the reference current and the modulation current,
      calculate modulation indexes associated with separate, respective code values of the driving strength control code, and
      generate a modulation index table that stores the modulation indexes.

2. The modulation index setting circuit of claim 1, wherein
   the processor is further configured to execute the program of instructions to automatically calculate the modulation indexes to generate the modulation index table in response to a determination that an NFC tag is not within a communication range of the NFC device, and
   the NFC device is configured to communicate with the NFC tag based on referring to the modulation index table and selecting a first modulation index of the modulation indexes according to a communication protocol between the NFC tag and the NFC device in response to a determination that the NFC tag is within the communication range of the NFC device.

3. The modulation index setting circuit of claim 1, wherein the processor is further configured to execute the program of instructions to gradually change a magnitude of the modulation current during the modulation interval based on gradually changing the code values of the driving strength control code.

4. The modulation index setting circuit of claim 1, wherein the processor is configured to execute the program of instructions to
   calculate the modulation indexes associated with the code values of the driving strength control code based on the reference current and the modulation current; and
   calculate a reference external impedance of the NFC device associated with each code value of the driving strength control code.

5. The modulation index setting circuit of claim 4, wherein the processor is configured to execute the program of instructions to, in response to a determination that an NFC tag is within a communication range of the NFC device,
   calculate an external impedance of the NFC device based on the transmitter current that flows in the transmitter, and
   selectively change the code values of the driving strength control code based on whether the reference external impedance matches the external impedance.

6. The modulation index setting circuit of claim 5, wherein the processor is configured to execute the program of instructions to maintain the code values of the driving strength control code in response to a determination that the reference external impedance matches the external impedance.

7. The modulation index setting circuit of claim 5, wherein the processor is configured to execute the program of instructions to change the code values of the driving strength control code in response to a determination that the reference external impedance does not match the external impedance.

8. The modulation index setting circuit of claim 4, wherein the processor is configured to execute the program of instructions to
compare the reference external impedance with the external impedance and
generate a comparison signal indicating a result of the comparison.

9. A near field communication (NFC) device, comprising:
a resonance circuit configured to transmit and receive data to and from an external NFC tag through an electromagnetic wave; and
an NFC chip configured to transmit output data to the resonance circuit and further configured to receive input data from the resonance circuit, the NFC chip including
a transmitter connected to the resonance circuit through a first transmission terminal and a second transmission terminal;
a regulator configured to output a transmission power supply voltage to the transmitter;
a modulation index setting circuit configured to calculate modulation indexes associated with separate, respective code values of a driving strength control code based on a reference current and a modulation current, the modulation index setting circuit further configured to generate a modulation index table that stores the modulation indexes, the reference current and the modulation current being generated based on detecting a transmitter current flowing in the transmitter during a non-modulation interval and during a modulation interval, respectively, in response to the driving strength control code; and
a processor configured to control the modulation index setting circuit and further configured to control the transmitter to communicate with the NFC tag based on referring to the modulation index table and selecting a first modulation index of the modulation indexes according to a communication protocol between the NFC tag and the NFC device in response to a determination that the NFC tag exists within a communication range of the NFC device.

10. The NFC device of claim 9, wherein the modulation index setting circuit includes
a current detector configured to generate the reference current based on detecting the transmitter current flowing in the transmitter during the non-modulation interval, the current detector further configured to generate the modulation current based on detecting the transmitter current flowing in the transmitter during the modulation interval;
a storage device storing a program of instructions; and
a modulation index setting circuit processor configured to execute the program of instructions to
change the transmitter current based on applying the driving strength control code to the transmitter,
receive the reference current and the modulation current,
calculate the modulation indexes associated with separate, respective code values of the driving strength control code, and
generate the modulation index table that stores the modulation indexes.

11. The NFC device of claim 10, wherein
the modulation index setting circuit processor is further configured to execute the program of instructions to automatically calculate the modulation indexes to generate the modulation index table in response to a determination that an NFC tag is not within a communication range of the NFC device, and
the transmitter is configured to communicate with the NFC tag based on referring to the modulation index table and selecting the first modulation index according to the communication protocol between the NFC tag and the NFC in response to a determination that the NFC tag is within the communication range of the NFC device.

12. The NFC device of claim 10, wherein the modulation index setting circuit processor is further configured to execute the program of instructions to sequentially change a magnitude of the modulation current in the modulation interval based on sequentially changing the code values of the driving strength control code.

13. The NFC device of claim 10, wherein the modulation index setting circuit processor is configured to execute the program of instructions to
calculate the modulation indexes associated with the code values of the driving strength control code based on the reference current and the modulation current; and
calculate a reference external impedance of the NFC device, associated with each code value of the driving strength control code.

14. The NFC device of claim 9, wherein the transmitter includes
a first driver including
a plurality of first pull-up transistors connected in parallel between the transmission power supply voltage and the first transmission terminal, and
a plurality of first pull-down transistors connected in parallel between the first transmission terminal and a ground voltage;
a second driver including
a plurality of second pull-up transistors connected in parallel between the transmission power supply voltage and the second transmission terminal, and
a plurality of second pull-down transistors connected in parallel between the second transmission terminal and the ground voltage; and
a controller configured to output driving signals to the first driver and the second driver in response to the driving strength control code or a control signal from the processor.

15. The NFC device of claim 14, wherein the modulation index setting circuit is configured to
sequentially turn-off the first pull-up transistors simultaneously with sequentially turning-off the second pull-down transistors based on sequentially decreasing the code values of the driving strength control code, or
sequentially turn-on the first pull-up transistors simultaneously with sequentially turning-on the second pull-down transistors based on sequentially increasing the code values of the driving strength control code.

16. The NFC device of claim 9, further comprising:
a tag detector configured to
    generate a first sensing current and a second sensing current flowing in the regulator in a preset phase and a detection phase, respectively, in response to the electromagnetic wave being radiated,
    compare the first sensing current and the second sensing current, and
    output a detection signal indicating that the NFC tag is within a communication range of the NFC device based on the comparison, and
wherein the processor is configured to change an operation mode of the NFC device from a stand-by mode to an active mode based on the detection signal.

17. The NFC device of claim 16, wherein the modulation index setting circuit is configured to, in response to a determination that the NFC tag is within the communication range of the NFC device,
    calculate an external impedance of the NFC device based on the current that flows in the transmitter,
    provide the processor with a comparison signal indicating whether the external impedance matches a reference external impedance, and
    selectively change the code values of the driving strength control code in response to a control signal from the processor.

18. The NFC device of claim 17, wherein the modulation index setting circuit is configured to change the code values of the driving strength control code in response to the control signal when the reference external impedance does not match the external impedance.

19. A method of operating a near field communication (NFC) device, the NFC device including a transmitter, a modulation index setting circuit and a processor configured to control the transmitter and the modulation index setting circuit, the method comprising:
    gradually changing a transmitter current that flows in the transmitter based on applying a driving strength control code to the transmitter to generate automatically a modulation index table that stores modulation indexes associated with code values of the driving strength control code based on the transmitter current in response to a determination that an NFC tag does not exist within a communication range of the NFC device; and
    controlling the transmitter to communicate with the NFC tag based on referring to the modulation index table and selecting a first modulation index of the modulation indexes according to a communication protocol between the NFC tag and the NFC device in response to a determination that the NFC tag exists within the communication range of the NFC device.

20. The method of claim 19, wherein the modulation index setting circuit includes a storage device, the storage device storing the modulation index table.

* * * * *